United States Patent
Iwayama et al.

(10) Patent No.: US 9,648,193 B2
(45) Date of Patent: May 9, 2017

(54) IMAGE READING APPARATUS FOR BOUND MEDIA

(71) Applicant: PFU Limited, Kahoku-shi, Ishikawa (JP)

(72) Inventors: Akira Iwayama, Ishikawa (JP); Masanari Takabatake, Ishikawa (JP); Masahiko Kobako, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 15/240,386

(22) Filed: Aug. 18, 2016

(65) Prior Publication Data

US 2016/0360060 A1    Dec. 8, 2016

Related U.S. Application Data

(63) Continuation of application No. PCT/JP2014/060629, filed on Apr. 14, 2014.

(51) Int. Cl.
*H04N 1/04* (2006.01)
*H04N 1/031* (2006.01)
(Continued)

(52) U.S. Cl.
CPC .............. *H04N 1/0313* (2013.01); *B42D 9/06* (2013.01); *G03B 27/32* (2013.01); *G06T 1/00* (2013.01);
(Continued)

(58) Field of Classification Search
CPC ........ H04N 1/0313; H04N 1/10; H04N 1/107; H04N 1/00827; H04N 1/1078; H04N 2201/0081
(Continued)

(56) References Cited

U.S. PATENT DOCUMENTS 5,493,943 A    2/1996 Horikawa
7,639,406 B1 * 12/2009 Proudfoot .......... H04N 1/19594
358/464
(Continued)

FOREIGN PATENT DOCUMENTS

JP    05-122467 A    5/1993
JP    05-155181 A    6/1993
(Continued)

OTHER PUBLICATIONS

Search Report issued in corresponding International Application No. PCT/JP2014/060629, dated Jul. 8, 2014.

*Primary Examiner* — Houshang Safaipour
(74) *Attorney, Agent, or Firm* — McDermott Will & Emery LLP

(57) ABSTRACT

An image reading apparatus for bound media includes a placement table, on which a bound medium is placed, a first arm that is opposite to a bound portion of the bound medium, a second arm, a lifting unit that lifts up a turned medium of the bound medium, a second arm moving mechanism that moves the second arm, so that the turned medium lifted by the lifting unit is sandwiched between the first arm and the second arm, an arm moving mechanism that moves the first arm and the second arm, so that the turned medium turns over, a first imaging unit that performs imaging of a side of the turned medium opposite to the first arm, and a second imaging unit that performs imaging of the a side of the turned medium opposite to the second arm.

7 Claims, 12 Drawing Sheets

(51) Int. Cl.
*B42D 9/06* (2006.01)
*G03B 27/32* (2006.01)
*G06T 1/00* (2006.01)
*H04N 1/10* (2006.01)
*H04N 1/107* (2006.01)
*H04N 1/00* (2006.01)

(52) U.S. Cl.
CPC ........... *H04N 1/00827* (2013.01); *H04N 1/10* (2013.01); *H04N 1/107* (2013.01); *H04N 1/1078* (2013.01); *H04N 2201/0081* (2013.01)

(58) Field of Classification Search
USPC ........................................ 358/497, 474, 498
See application file for complete search history.

(56) References Cited

U.S. PATENT DOCUMENTS

| | | | |
|---|---|---|---|
| 9,457,609 B2* | 10/2016 | Hasegawa | B42D 9/04 |
| 2004/0016337 A1 | 1/2004 | McNab et al. | |
| 2004/0027547 A1 | 2/2004 | Stemmle et al. | |
| 2013/0077138 A1 | 3/2013 | Shen | |
| 2016/0080598 A1* | 3/2016 | Chen | H04N 1/00525 |
| | | | 358/488 |

FOREIGN PATENT DOCUMENTS

| | | |
|---|---|---|
| JP | 06-048067 A | 2/1994 |
| JP | 06-253108 A | 9/1994 |

\* cited by examiner

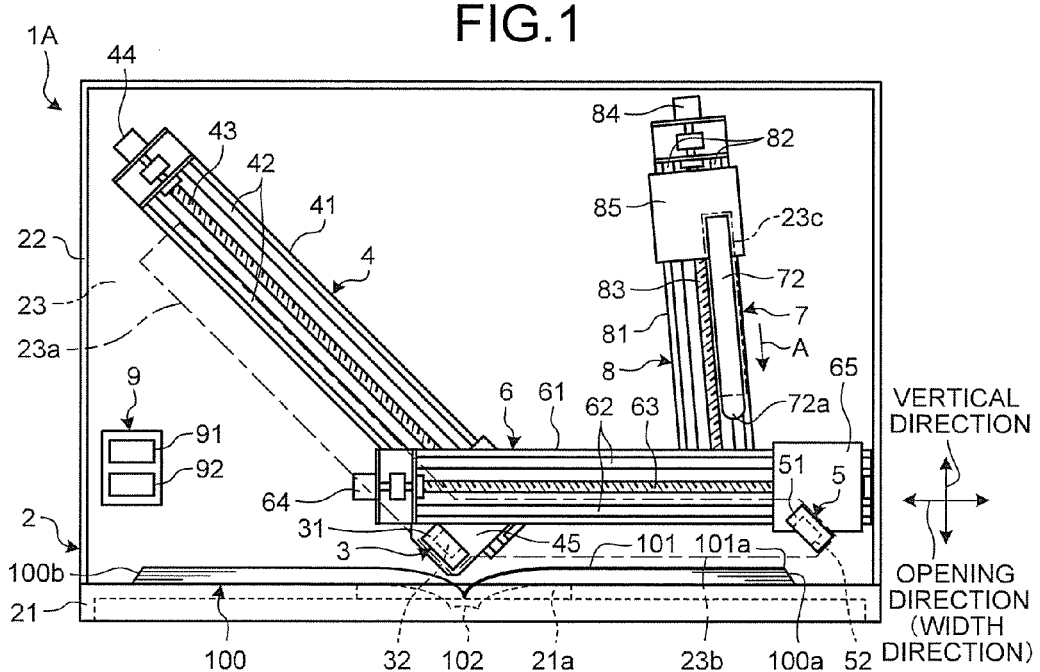
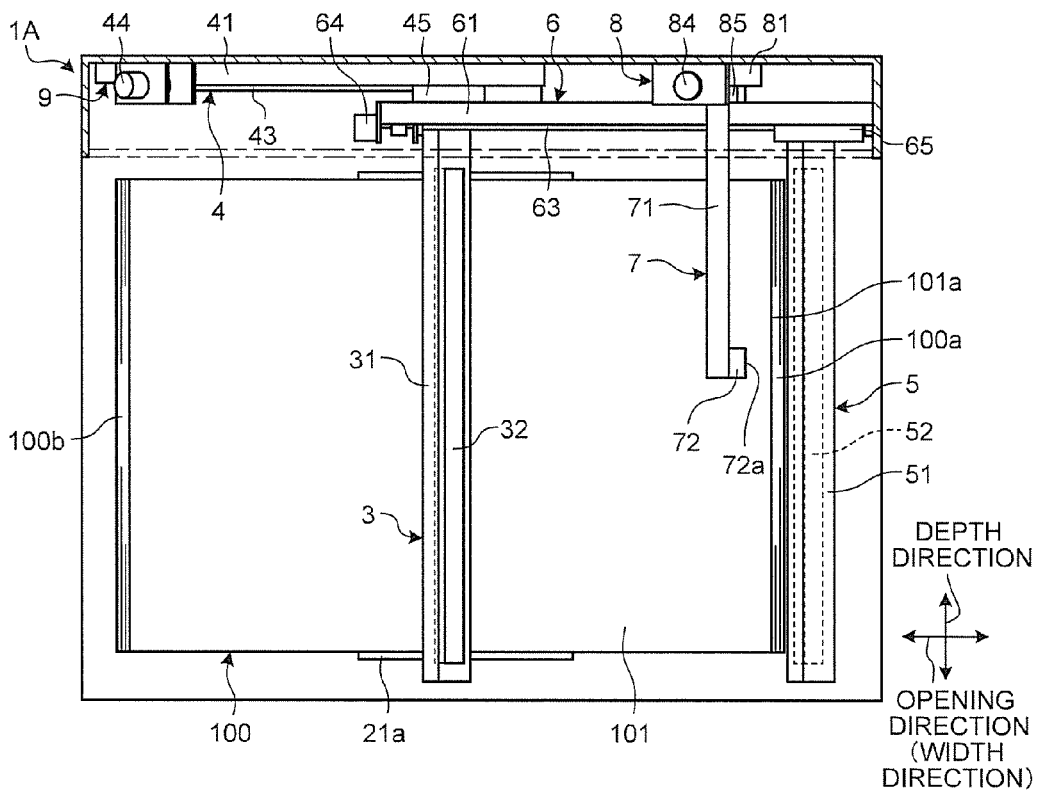

FIG.14
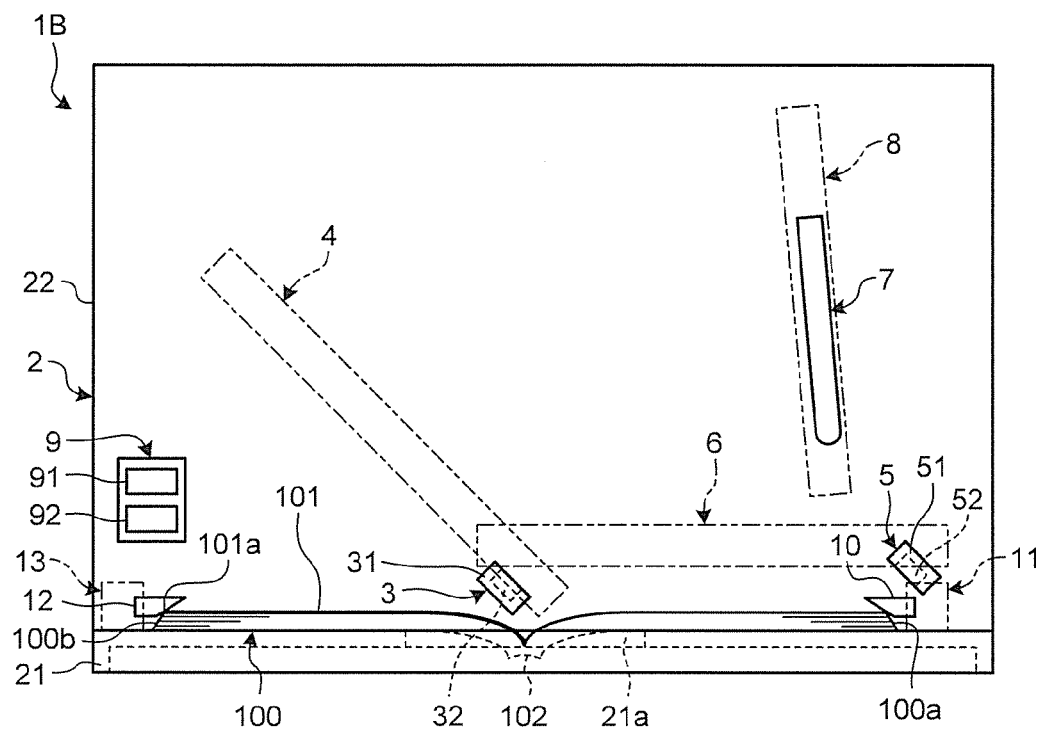
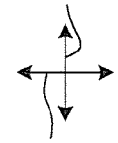

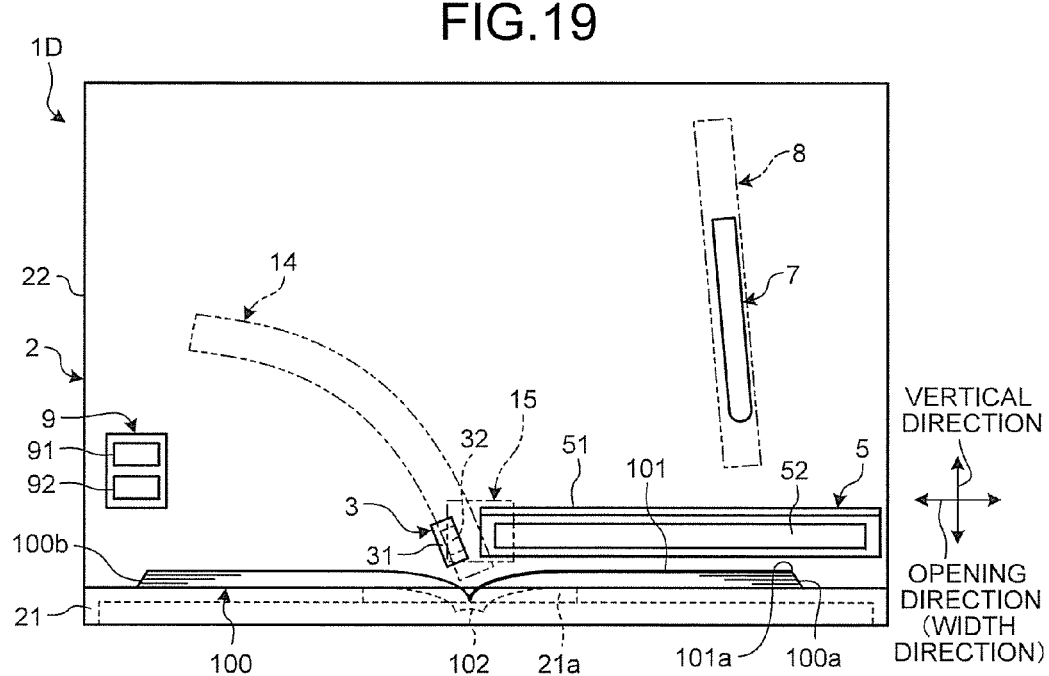
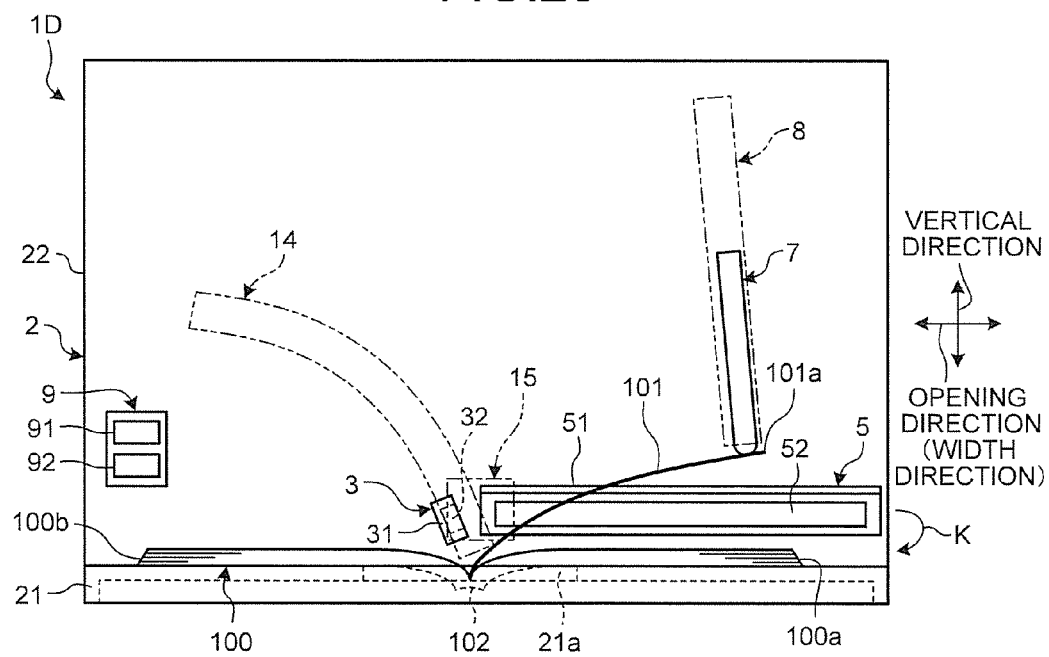

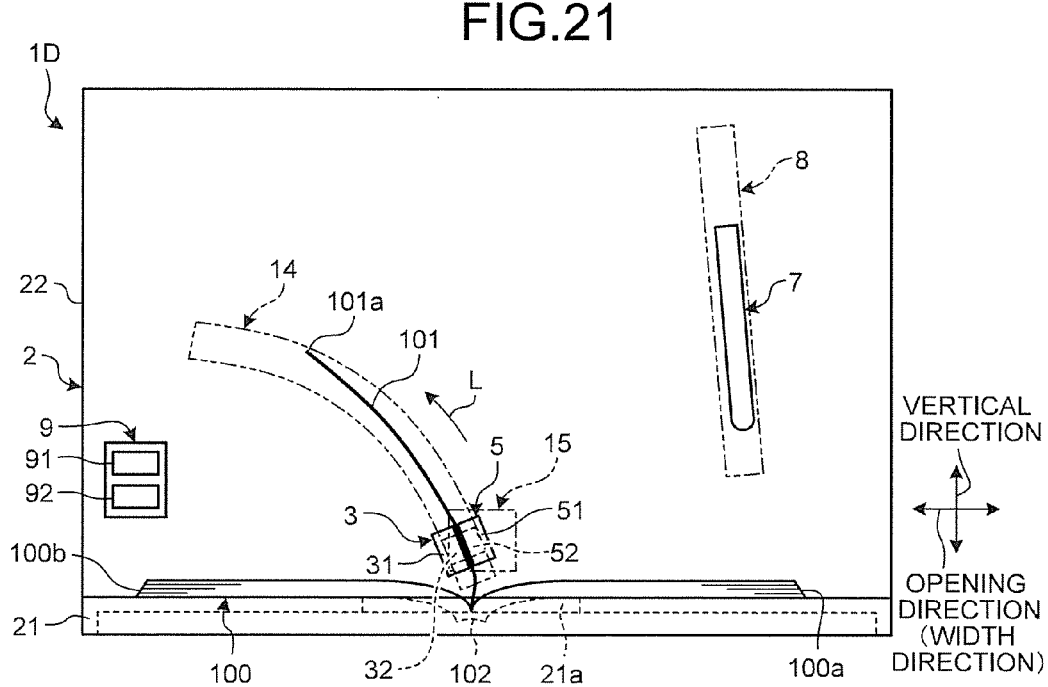
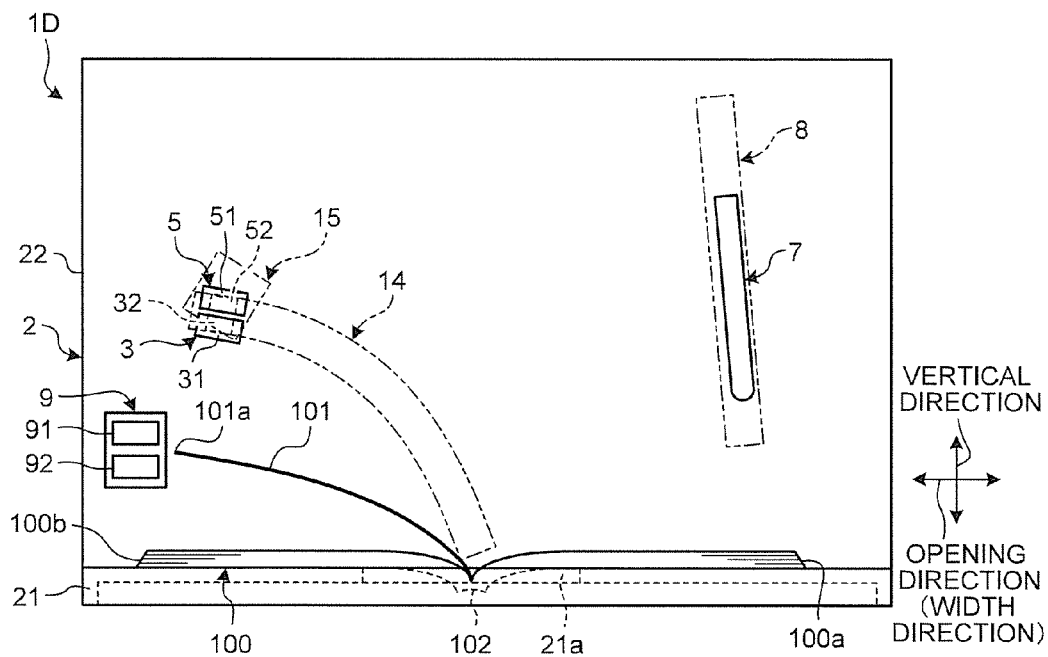

IMAGE READING APPARATUS FOR BOUND MEDIA

CROSS-REFERENCE TO RELATED APPLICATION(S)

This application is a continuation of International Application No. PCT/JP2014/060629, filed on Apr. 14, 2014, the entire contents of which are incorporated herein by reference.

FIELD

The embodiments discussed herein are related to an image reading apparatus for bound media.

BACKGROUND

In recent years, digitalization of bound media, such as books and magazines, has been demanded. Methods of digitalizing bound media include: a method of reading an image of each sheet by use of a normal image reading apparatus; and a method of reading images of a bound medium by turning over pages of the bound medium without unbinding the bound medium. For the latter case, an image reading apparatus for bound media has been proposed, which automatically turns over pages of a bound medium and reads images of the bound medium by use of an imaging unit. Conventional image reading apparatuses for bound media include: an apparatus with an imaging unit and a turning unit that turns over pages of a bound medium, the imaging unit and turning unit provided separately (for example, see the specification of U.S. Patent Application Publication No. 2004/0027547); and an apparatus with an imaging unit and a turning unit, which are provided integrally (for example, see Japanese Laid-open Patent Application No. H06-253108 and Japanese Laid-open Patent Application No. H05-155181).

When a turning unit turns over pages of a bound medium by sandwiching, from both sides, a turned medium to be turned over, before the turning operation by the turning unit, the turned medium of the bound medium is lifted up from the bound medium. Therefore, until the turned medium has been lifted up from the bound medium, the turning unit waits at a position not overlapping the bound medium as viewed in a vertical direction. Accordingly, there has been a problem that the installation space for the image reading apparatus for bound media becomes large with respect to the bound medium.

The present disclosure has been made in view of the above, and an object thereof is to propose an image reading apparatus for bound media, which enables its installation space to be reduced.

SUMMARY

According to an aspect of the embodiments, an image reading apparatus for bound media includes a placement table, on which a bound medium is placed, a first arm that is, at a first standby position, opposite to a bound portion of the bound medium, and is, in turning operation in which a turned medium of the bound medium turns over from one side to the other side in an opening direction of the bound medium, opposite to the other side of the turned medium, a second arm that does not overlap, at a second standby position, the bound medium as viewed in a vertical direction, and that is, in the turning operation, opposite to the one side of the turned medium, a lifting unit that lifts up, from the bound medium, an end portion of the turned medium before the turning, the end portion at the one side in the opening direction, a second arm moving mechanism that moves the second arm from the second standby position to a turning operation start position where the second arm is opposite to the first arm at the first standby position with the turned medium sandwiched between the first arm and the second arm, in a state where the turned medium has been lifted up from the bound medium, an arm moving mechanism that relatively moves, with respect to the turned medium, the first arm and the second arm sandwiching the turned medium and opposite to each other from the bound portion side of the turned medium until a distal end portion of the turned medium slips out therefrom, and that moves the turned medium to the other side of the bound portion as viewed in the vertical direction of the bound medium, a first imaging unit that is provided, in the first arm, oppositely to the turned medium in the turning operation, and that performs imaging of the other side of the turned medium, and a second imaging unit that is provided, in the second arm, oppositely to the turned medium in the turning operation, and that performs imaging of the one side of the turned medium.

The object and advantages of the technique will be realized and attained by means of the elements and combinations particularly pointed out in the claims.

It is to be understood that both the foregoing general description and the following detailed description are exemplary and explanatory and are not restrictive of the technique, as claimed.

BRIEF DESCRIPTION OF THE DRAWINGS

FIG. 1 is a front view of an image reading apparatus for bound media according to a first embodiment.

FIG. 2 is a plan view of the image reading apparatus for bound media according to the first embodiment.

FIG. 14 is an explanatory diagram for the operation of the image reading apparatus for bound media according to the second embodiment.

FIG. 19 is a front view of an image reading apparatus for bound media according to a fourth embodiment.

FIG. 20 is an explanatory diagram for operation of the image reading apparatus for bound media according to the fourth embodiment.

FIG. 21 is an explanatory diagram for the operation of the image reading apparatus for bound media according to the fourth embodiment.

FIG. 22 is an explanatory diagram for the operation of the image reading apparatus for bound media according to the fourth embodiment.

DESCRIPTION OF EMBODIMENTS

Hereinafter, the technique disclosed in this application will be described in detail with reference to the drawings. The technique is not limited by embodiments described below. Further, components in the following embodiments include those easily expected by persons skilled in the art or those that are substantially the same.

First Embodiment

Figure 3:
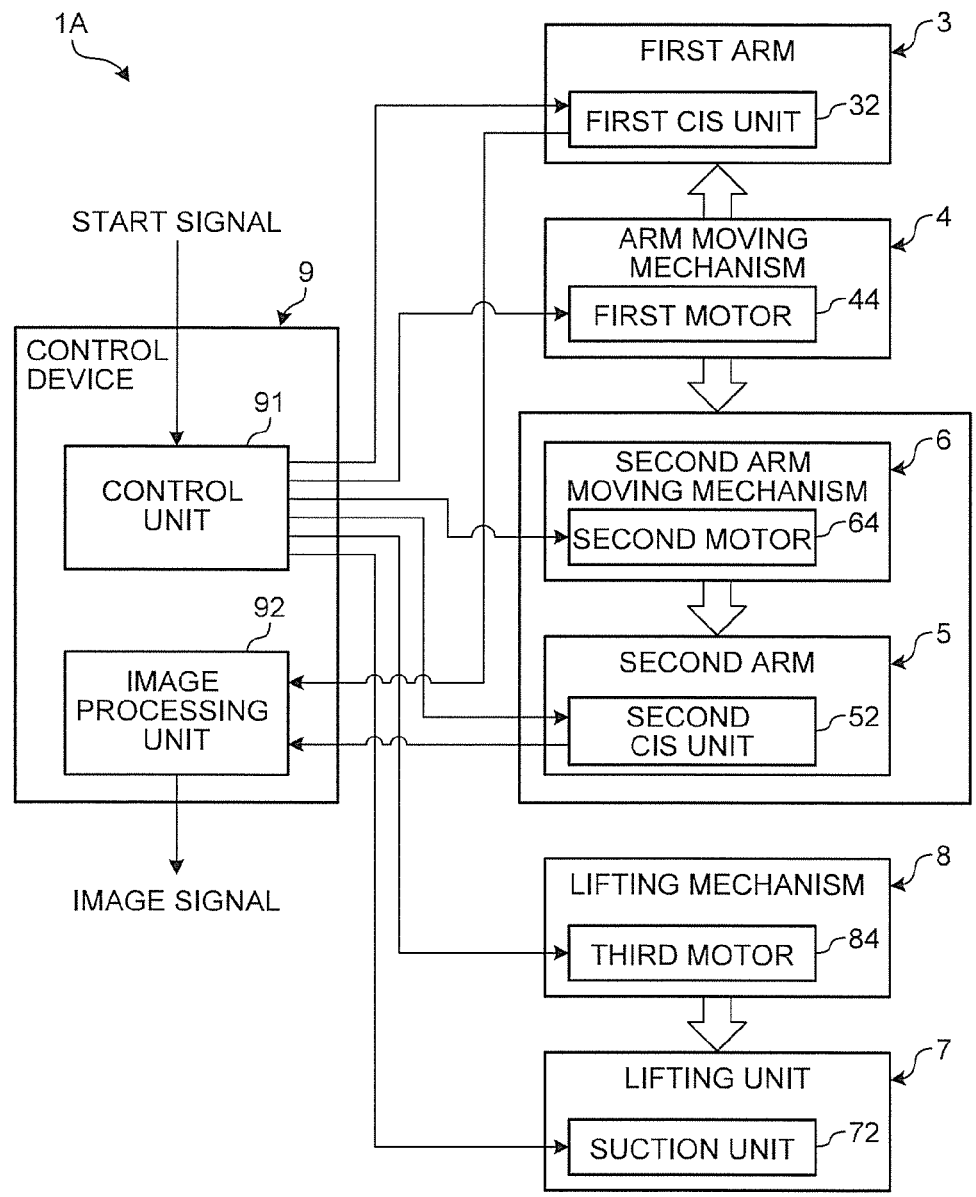
FIG. 3 is a block diagram of the image reading apparatus for bound media according to the first embodiment.
Figure 4:
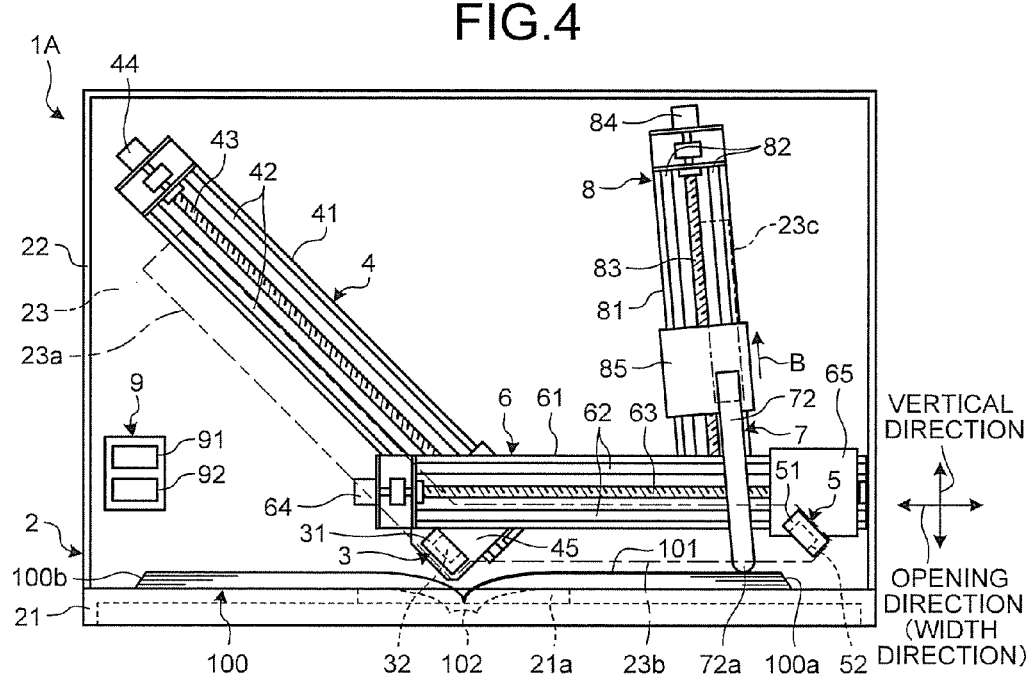
FIG. 4 is an explanatory diagram for operation of the image reading apparatus for bound media according to the first embodiment.
Figure 5:
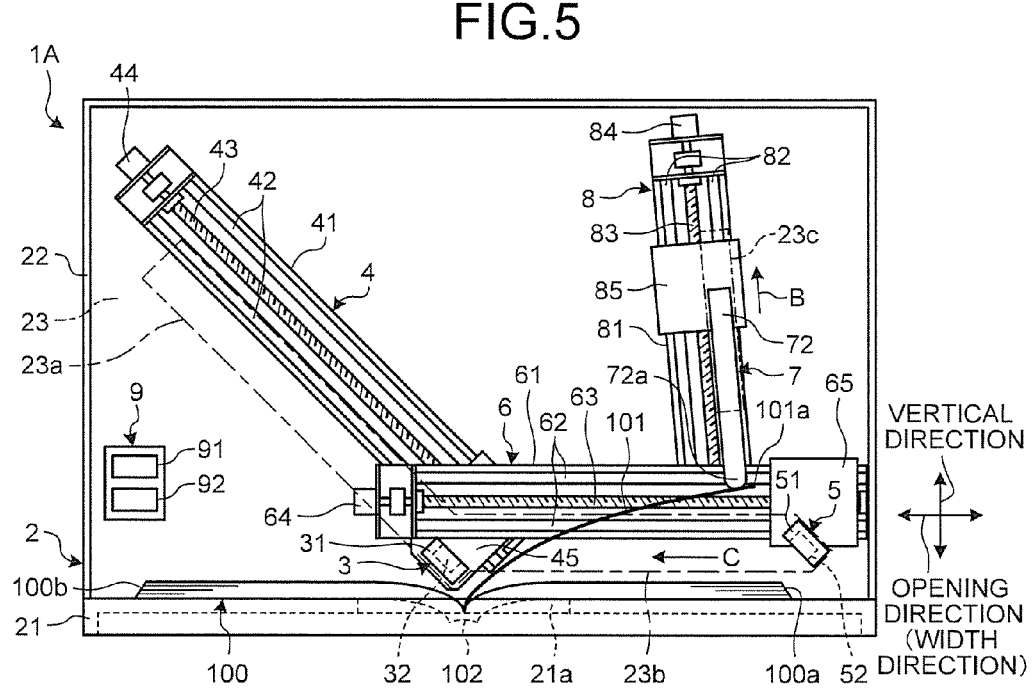
FIG. 5 is an explanatory diagram for the operation of the image reading apparatus for bound media according to the first embodiment.
Figure 6:
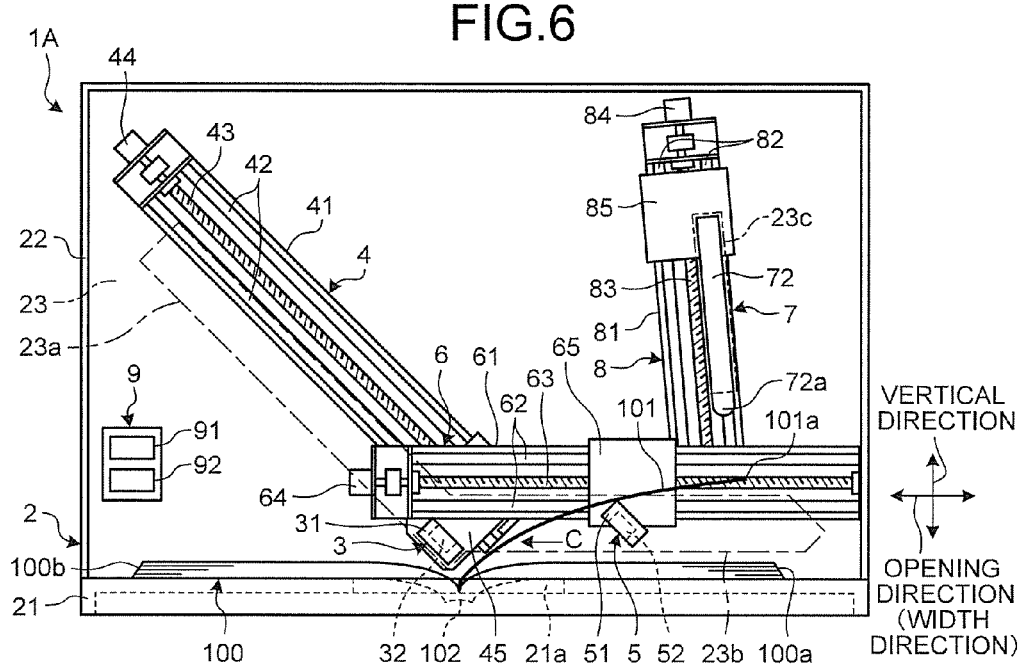
FIG. 6 is an explanatory diagram for the operation of the image reading apparatus for bound media according to the first embodiment.
Figure 7:
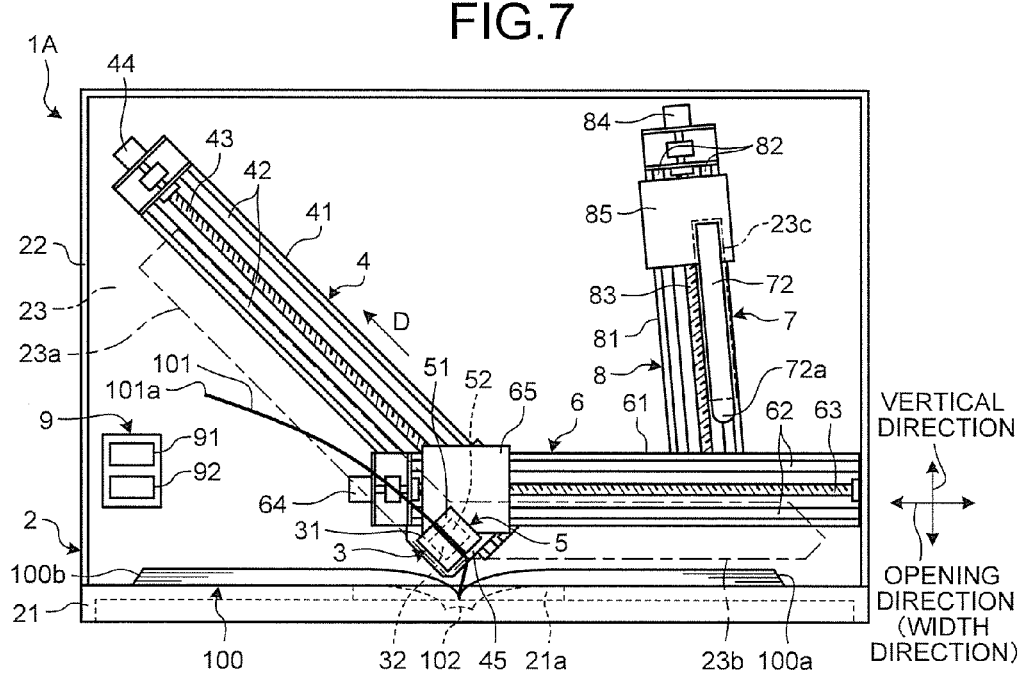
FIG. 7 is an explanatory diagram for the operation of the image reading apparatus for bound media according to the first embodiment.
Figure 8:
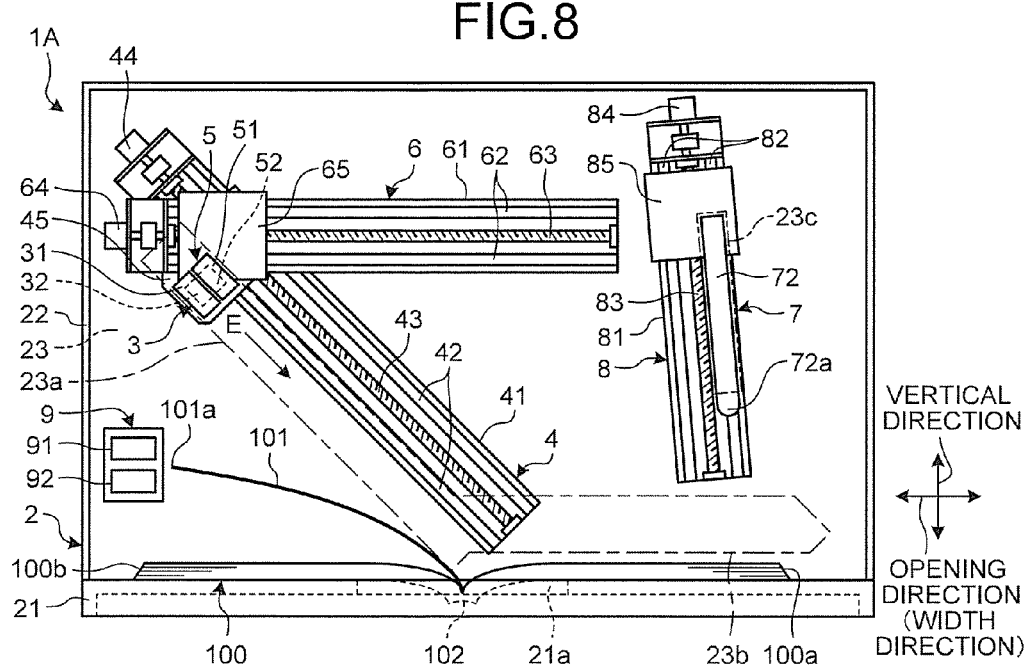
FIG. 8 is an explanatory diagram for the operation of the image reading apparatus for bound media according to the first embodiment.
Figure 9:
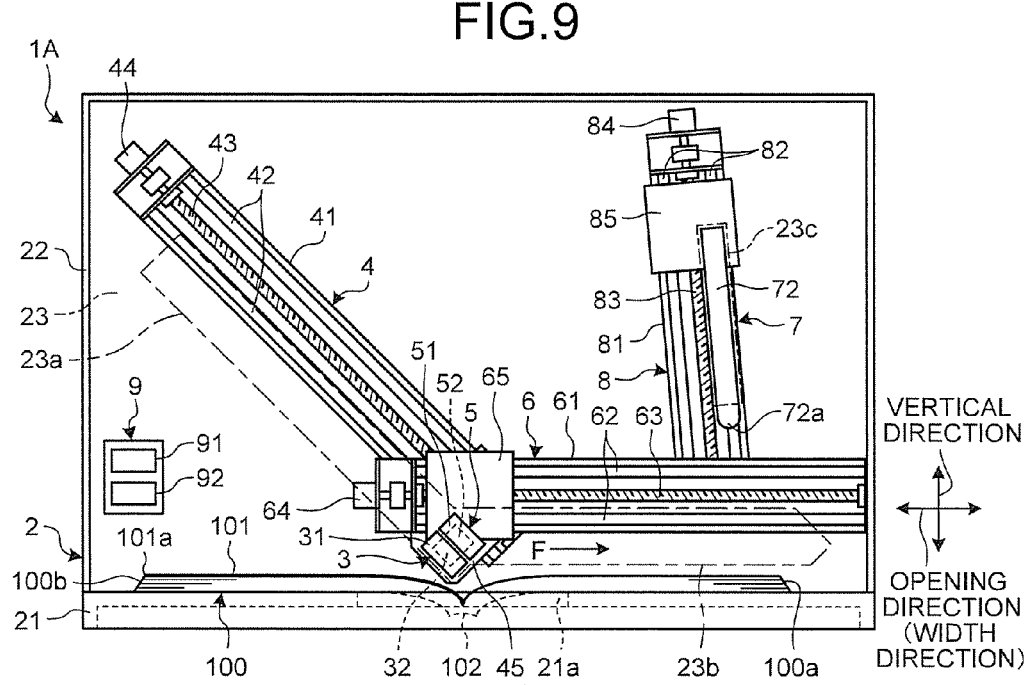
FIG. 9 is an explanatory diagram for the operation of the image reading apparatus for bound media according to the first embodiment.

FIG. 1 is a front view of an image reading apparatus for bound media according to a first embodiment. FIG. 2 is a plan view of the image reading apparatus for bound media according to the first embodiment. FIG. 3 is a block diagram of the image reading apparatus for bound media according to the first embodiment. FIG. 4 is an explanatory diagram for operation of the image reading apparatus for bound media according to the first embodiment. FIG. 5 is an explanatory diagram for the operation of the image reading apparatus for bound media according to the first embodiment. FIG. 6 is an explanatory diagram for the operation of the image reading apparatus for bound media according to the first embodiment. FIG. 7 is an explanatory diagram for the operation of the image reading apparatus for bound media according to the first embodiment. FIG. 8 is an explanatory diagram for the operation of the image reading apparatus for bound media according to the first embodiment. FIG. 9 is an explanatory diagram for the operation of the image reading apparatus for bound media according to the first embodiment. An image reading apparatus for bound media 1A according to the first embodiment reads a bound medium 100, as illustrated in FIG. 1, by, while turning over pages of the bound medium 100 formed of plural sheet media bound by a bound portion 102, capturing images of both sides of a turned medium 101 to be turned over from the bound medium 100 and generating image data corresponding to both sides of the turned medium 101. The bound medium 100 is not particularly limited, and is: for example, a book; a magazine; documents formed of plural sheets of paper bound with a staple, a clip, or the like; or the like. Hereinafter, the same signs in the respective first to fourth embodiments refer to the same components, and thus description thereof will be omitted or simplified.

The image reading apparatus for bound media 1A includes, as illustrated in FIG. 1 and FIG. 2, a placement table 2, a first arm 3, an arm moving mechanism 4, a second arm 5, a second arm moving mechanism 6, a lifting unit 7, a lifting mechanism 8, and a control device 9. In the image reading apparatus for bound media 1A, a direction in which the bound medium 100 is opened (opening direction) is referred to as "width direction", a direction (extending direction) in which the bound portion 102 extends as "depth direction", and an up-down direction orthogonal to the width direction and the depth direction as "vertical direction". The image reading apparatus for bound media 1A in this embodiment is configured to read the predetermined bound medium 100, in which each sheet medium has a predetermined size, and which has a predetermined thickness.

The bound medium 100 is placed on the placement table 2, which is formed of a placement table main body 21, a device fixing unit 22, and a panel 23.

The placement table main body 21 is formed to have an area such that when the bound medium 100 is opened left and right, the bound medium 100 in the opened state is able to be placed within the area as viewed in the vertical direction. The placement table main body 21 has a flatly formed surface, on which the bound medium 100 is placed, and an insertion opening 21a formed in the center. The bound portion 102 is inserted in the insertion opening 21a in a state where the bound medium 100 has been placed. That is, the bound portion 102 is positioned, on the placement table 2, at a position lower than, that is, below an end portion 100a at one side of the bound medium 100 in the opened state and an end portion 100b at the other side thereof, the one side and the other side in the opening direction. Therefore, as compared to a case where the bound medium 100 in the opened state has been placed on a placement table 2 without the insertion opening 21a, a portion near the bound portion 102 of the bound medium 100 is able to be prevented from rising upward in the vertical direction, and thus the second arm 5 is prevented from contacting the bound medium 100 or pressing the bound medium 100 in a contact state downwards in the vertical direction when the second arm 5 moves from a second standby position to a turning operation start position, which will be described later. Thereby, the bound medium 100 is able to be prevented from being damaged.

Each device of the image reading apparatus for bound media 1A is fixed to the device fixing unit 22, which stands upward in the vertical direction from an end portion (end portion at a far side) at one side in the depth direction of the placement table main body 21. The arm moving mechanism 4, the second arm moving mechanism 6, and the lifting mechanism 8 are fixed to the device fixing unit 22.

The panel 23 is provided at an end portion (end portion at a near side) at the other side in the depth direction of the device fixing unit 22. The panel 23 is formed in a flat plate shape, and prevents each device of the image reading apparatus for bound media 1A from being exposed outside. The panel 23 has an opening 23a, which is formed along a track, along which the first arm 3 at a first standby position and the second arm 5 at the turning operation start position, which will be described later, move to a turning operation completion position. The panel 23 has an opening 23b, which is formed along a track, along which the second arm 5 in the later described second standby position moves to the turning operation start position. The panel 23 has an opening 23c, which is formed along a track, along which the lifting unit 7 at a third standby position, which will be described later, moves to a medium contact position. The opening 23a and the opening 23b communicate into each other to form one opening.

The first arm 3 is opposite to the other side of the turned medium 101 of the bound medium 100 in turning operation of the turned medium 101, the turned medium 101 to be turned over from one side (end portion 100a side) to the other side (end portion 100b side) in the opening direction of the bound medium 100. By the arm moving mechanism 4, the first arm 3 is movably supported between the first standby position and the turning operation completion position. At the first standby position, the first arm 3 is opposite to the bound portion 102 of the bound medium 100. The first standby position is, as illustrated in FIG. 1 and FIG. 2, a position, where the first arm 3 is opposite, in the vertical direction, to the bound portion 102 of the bound medium 100 placed on the placement table 2. In consideration of the thickness of the bound medium 100, the first arm 3 at the first standby position is separated from the placement table main body 21 by a predetermined distance. The first arm 3 includes a first unit holding portion 31 and a first CIS unit 32.

The first unit holding portion 31 causes the first CIS unit 32 to be opposite to the turned medium 101 in the turning operation. The first unit holding portion 31 is formed to extend in the depth direction, with one end portion (end portion at the far side) at one side thereof fixed to the arm moving mechanism 4, and an end portion (end portion at the near side) at the other side thereof positioned, as viewed in the vertical direction, inside the placement table main body 21 and outside the insertion opening 21a. The first unit holding portion 31 holds the first CIS unit 32 such that the first CIS unit 32 is exposed on a surface of the first arm 3 opposite to the second arm 5, which is at the turning operation start position.

The first CIS unit 32 is a contact image sensor (CIS), that is a contact sensor type imaging unit, and functions as a first imaging unit. The first CIS unit 32 is provided oppositely to the turned medium 101 in the turning operation, and reads the other side of the turned medium 101, that is, a side on the other side, of the two sides of the turned medium 101. The first CIS unit 32 includes: plural imaging elements, which are arranged in one or more lines in an extending direction of the first arm 3 and not illustrated; a light source; and the like. The first CIS unit 32 reads the surface on the other side of the turned medium 101, with the depth direction being a main scanning direction, by the other side of the turned medium 101 sandwiched between the first arm 3 and the second arm 5 being irradiated, from the surface opposite to the second arm 5 at the turning operation start position, with light from the light source, and the plural imaging elements imaging reflected light reflected by the turned medium 101. As illustrated in FIG. 3, the first CIS unit 32 is connected to the control device 9. As illustrated in FIG. 2, the main scanning direction of the first CIS unit 32 and a later described second CIS unit 52, that is, an imaging range in the depth direction is set to be a range wider than a width in a direction orthogonal to the opening direction of the predetermined bound medium 100, that is, the width thereof in the depth direction, in a state where the first CIS unit 32 and the second CIS unit 52 are opposite to the turned medium 101. The imaging range in the depth direction of the first CIS unit 32 and the second CIS unit 52 in this embodiment is a range wider than the insertion opening 21a.

The arm moving mechanism 4 turns over the turned medium 101 by causing the first arm 3 and the second arm 5 sandwiching the turned medium 101 and opposite to each other to move relatively to the turned medium 101. The arm moving mechanism 4 moves the first arm 3 from the first standby position to the turning operation completion position. Further, the arm moving mechanism 4 moves the second arm 5 positioned at the turning operation start position to the turning operation completion position. As illustrated in FIG. 8, the turning operation completion position is a position where a distal end portion 101a of the turned medium 101 sandwiched between the first arm 3 and the second arm 5 slips out from the first arm 3 and the second arm 5, and a position at the other side of the bound portion 102 in the bound medium 100 when the turned medium 101 is viewed in the vertical direction. At the turning operation completion position according to this embodiment, an angle formed between a line, which joins the first standby position and the turning operation completion position, and the vertical direction is about 45 degrees, and the turning operation completion position is distanced from the first standby position such that the distal end portion 101a of the turned medium 101 is able to be slipped out from the first arm 3 and the second arm 5.

The arm moving mechanism 4 according to this embodiment is, as illustrated in FIG. 1 and FIG. 2, a linearly moving mechanism, and moves the first arm 3 and the second arm 5 sandwiching the turned medium 101 and opposite to each other, along a straight lined track as viewed in the extending direction of the bound portion 102, that is, the depth direction, from the first standby position and the turning operation start position to the turning operation completion position. The arm moving mechanism 4 includes a main body 41, a pair of rails 42 and 42, a ball screw 43, a first motor 44, and a moving base 45. In the main body 41, the pair of rails 42 are fixed and the ball screw 43 is rotatably supported. The pair of rails 42 and 42 are arranged to sandwich the ball screw 43 and parallel to each other, and movably support the moving base 45 in an extending direction of the rails 42. The ball screw 43 moves the moving base 45 in the extending direction of the rails 42 and is screwed into a nut fixed to the moving base 45. The first motor 44 rotates the ball screw 43 and is connected, as illustrated in FIG. 3, to the control device 9. The moving base 45 moves, as illustrated in FIG. 1, within a preset region, with respect to the pair of rails 42 and 42. The first arm 3 is directly fixed to the moving base 45, and the second arm 5 is fixed to the moving base 45 via the second arm moving mechanism 6. When the moving base 45 is positioned at an end portion (start end portion) at one side of the set region, the first arm 3 and the second arm 5 are respectively positioned at the first standby position and turning operation start position, and when the moving base 45 is at an end portion (terminal end portion) at the other side, the first arm 3 and the second arm 5 are at the turning operation completion position.

The second arm 5 is opposite to the one side of the turned medium 101 of the bound medium 100 in the turning operation of the turned medium 101. By the second arm moving mechanism 6, the second arm 5 is movably supported between the second standby position and the turning operation start position. By the first arm moving mechanism 4, the second arm 5 is movably supported between the turning operation start position and the turning operation completion position. As illustrated in FIG. 2, at the second standby position, the second arm 5 does not overlap the bound medium 100 as viewed in the vertical direction. The second arm 5 is formed, such that an extending direction of the second arm 5 at the second standby position is along an end side of the medium on the one side of the bound portion 102, that is, an end side of the turned medium 101 before the lifting (before the turning) by the later described lifting unit 7, the turned medium 101 being of the bound medium 100 placed on the placement table 2 and in the opened state. The second standby position in this embodiment is outside an end portion at the one side of the turned medium 101 before the turning, the one side in the opening direction of the bound medium 100, that is, outside the distal end portion 101a, and the extending direction of the second arm 5 is along the extending direction of the bound portion 102, that is, along the end side of the turned medium 101, the end side parallel to the depth direction. The second arm 5 includes a second unit holding portion 51 and a second CIS unit 52.

The second unit holding portion 51 causes the second CIS unit 52 to be opposite to the turned medium 101 in the turning operation. The second unit holding portion 51 is formed to extend in the depth direction, with one end portion (end portion at the far side) at one side thereof fixed to the second arm moving mechanism 6, and an end portion (end portion at the near side) at the other side thereof positioned, as viewed in the vertical direction, inside the placement table main body 21 and outside the insertion opening 21a. The second unit holding portion 51 holds the second CIS unit 52 such that the second CIS unit 52 is exposed on a surface of the second arm 5 opposite to the first arm 3, which is at the first standby position. Between the first arm 3 at the first standby position and the second arm 5 at the turning operation start position, a gap is formed, between which the turned medium 101 is able to move relatively thereto in the turning operation. In this embodiment, a surface of the first arm 3, the surface opposite to the second arm 5 at the turning operation start position, and a surface of the second arm 5, the surface opposite to the first arm 3 at the first standby position, are sloped to the other side in the opening direction of the bound medium 100 from the vertical direction, and are parallel to each other.

The second CIS unit 52 functions as a second imaging unit. The second CIS unit 52 is provided opposite to the turned medium 101 in the turning operation, and reads one side of the turned medium 101, that is, a side on the one side, of the two sides of the turned medium 101. As illustrated in FIG. 3, the second CIS unit 52 is connected to the control device 9. A basic configuration of the second CIS unit 52 is similar to that of the above described first CIS unit 32, and thus description thereof will be omitted.

As illustrated in FIG. 1, the second arm moving mechanism 6 moves the second arm 5 from the second standby position to the turning operation start position (see FIG. 7) in a state where the turned medium 101 has been lifted up from the bound medium 100. The turning operation start position is a position where the turned medium 101 is able to be sandwiched between the second arm 5 and the first arm 3, with the second arm 5 being opposite to the first arm 3 at the first standby position.

The second arm moving mechanism 6 according to this embodiment is, as illustrated in FIG. 1, a linearly moving mechanism, and moves the second arm 5 from the second standby position to the turning operation start position, along a track, which is, as viewed in the depth direction, parallel to the opening direction of the bound medium 100 and straight lined. The second arm moving mechanism 6 includes a main body 61, a pair of rails 62 and 62, a ball screw 63, a second motor 64, and a moving base 65. In the main body 61, the pair of rails 62 and 62 are fixed, and the ball screw 63 is rotatably supported. The pair of rails 62 and 62 are arranged to sandwich the ball screw 63 and parallel to each other, and movably support the moving base 65 in an extending direction of the rails 62. The ball screw 63 moves the moving base 65 in the extending direction of the rails 62 and is screwed into a nut fixed to the moving base 65. The second motor 64 rotates the ball screw 63 and is connected, as illustrated in FIG. 3, to the control device 9. The moving base 65 moves within a preset region, with respect to the pair of rails 62 and 62. The second arm 5 is directly fixed to the moving base 65. When the moving base 65 is positioned at an end portion (start end portion) at one side, the second arm 5 is at the second standby position, and when the moving base 65 is at an end portion (terminal end portion) at the other side, the second arm 5 is at the turning operation start position.

The lifting unit 7 lifts up the end portion 100a at the one side in the opening direction, from the bound medium 100, the end portion 100a of the turned medium 101 before the turning. The lifting unit 7 is movably supported by the lifting mechanism 8 between the third standby position and a lift start position. The lifting unit 7 in this embodiment lifts up the turned medium 101 from the bound medium 100 by sucking the turned medium 101 with negative pressure generated by a negative pressure generating source not illustrated. The lifting unit 7 includes an arm portion 71 and a suction portion 72. The turned medium 101 before being turned over is in a state overlapping another medium at the one side in the opening direction of the bound portion 102 of the bound medium 100.

As illustrated in FIG. 2, the arm portion 71 positions the suction portion 72 at the center in the depth direction of the turned medium 101 before the turning thereof, as viewed in the vertical direction. The arm portion 71 is formed to extend in the depth direction, with an end portion (end portion at the far side) at one side thereof fixed to the lifting mechanism 8 and an end portion (end portion at the near side) at the other side thereof fixed to the suction portion 72.

The suction portion 72 sucks the turned medium 101 by use of negative pressure, and sucks the turned medium 101 by an opening not illustrated being formed at a distal end portion 72a thereof and the negative pressure being supplied to the opening, to thereby suck the turned medium 101 at the distal end portion 72a and maintain the sucked state. As illustrated in FIG. 3, the suction portion 72 is connected to the control device 9. The supply of negative pressure to the suction portion 72 is performed by a hose, which is: installed outside or inside the arm portion 71; connected to the negative pressure generating source; and not illustrated. The distal end portion 72a is preferably formed of a material that is able to elastically return after being elastically deformed by external force, in order to prevent the bound medium 100 from being damaged by the lifting unit 7 contacting the turned medium 101.

As illustrated in FIG. 1, the lifting mechanism 8 moves the lifting unit 7 from the third standby position to the lift start position in a state where the turned medium 101 has been sucked by the lifting unit 7. The third standby position is positioned upward in the vertical direction than the lift start position, and is a position where the turned medium 101 sucked by the lifting unit 7 separates from the lifting unit 7, that is, where the turned medium 101 becomes unable to be sucked by the lifting unit 7. In other words, when the lifting unit 7 is at the third standby position, even if the sucking of the turned medium 101 by the suction portion 72 is being attempted, the turned medium 101 separates from the lifting unit 7. Further, the lift start position is a position where the lifting unit 7 contacts the turned medium 101 before the turning thereof, that is, where the distal end portion 72a of the suction portion 72 contacts the turned medium 101 before the turning thereof. Since the distal end portion 72a is able to be elastically deformed, the lift start position in this embodiment is a position separated from the placement table main body 21 by a predetermined distance as viewed in the depth direction.

As illustrated in FIG. 1, the lifting mechanism 8 according to this embodiment is a linearly moving mechanism, and causes the lifting unit 7 to be sloped to the opening direction from the vertical direction as viewed in the depth direction and to move the lifting unit 7 from the third standby position to the lift start position along a straight lined track. The lifting mechanism 8 includes a main body 81, a pair of rails 82 and 82, a ball screw 83, a third motor 84, and a moving base 85. In the main body 81, the pair of rails 82 and 82 are fixed, and the ball screw 83 is rotatably supported. The pair of rails 82 and 82 are arranged to sandwich the ball screw 83 and parallel to each other, and movably support the moving base 85 in an extending direction of the rails 82. The ball screw 83 moves the moving base 85 in the extending direction of the rails 82 and is screwed into a nut fixed to the moving base 85. The third motor 84 rotates the ball screw 83 and is connected, as illustrated in FIG. 3, to the control device 9. The moving base 85 moves within a preset region, with respect to the pair of rails 82 and 82. The second arm 5 is directly fixed to the moving base 85. When the moving base 85 is positioned at an end portion (start end portion) at one side thereof, the lifting unit 7 is at the third standby position, and when the moving base 85 is at an end portion (terminal end portion) at the other side thereof, the lifting unit 7 is at the lift start position.

The control device 9 controls the image reading apparatus for bound media 1A, and controls the turning operation of the turned medium 101 by the first arm 3 and the second arm 5 and reading operation of both sides of the turned medium 101 by the first CIS unit 32 and the second CIS unit 52. As illustrated in FIG. 3, the control device 9 includes, as functions thereof, a control unit 91 and an image processing unit 92. A hardware configuration of the control device 9 is mainly formed of a central processing unit (CPU) that performs arithmetic processing, memories (RAM and ROM) storing therein a program and information, input and output interfaces, and the like, similarly to a known personal computer or a scanner device, and thus detailed description thereof will be omitted. The control device 9 in this embodiment is arranged in a space formed between the device fixing unit 22 and the panel 23. Further, the control device 9 may be connected to another electronic device wiredly or wirelessly. That is, the image reading apparatus for bound media 1A may function as a network scanner.

The control unit 91 performs drive control of the arm moving mechanism 4, the second arm moving mechanism 6, the lifting mechanism 8, the first CIS unit 32, the second CIS unit 52, and the lifting unit 7. The control unit 91 in this embodiment performs drive control of the first motor 44, the second motor 64, and the third motor 84. The control unit 91 performs lighting control of the non-illustrated light sources of the first CIS unit 32 and the second CIS unit 52, and controls imaging by the imaging elements. The control unit 91 controls suction and release of the turned medium 101 by the suction portion 72 of the lifting unit 7. Based on a start signal input by a user operating an operating unit not illustrated, the control unit 91 starts the turning operation and reading operation by the image reading apparatus for bound media 1A.

The image processing unit 92 respectively generates, based on imaging signals from the imaging elements of the first CIS unit 32 and the second CIS unit 52, image data corresponding to both sides of the turned medium 101. The image processing unit 92 is able to output image signals in order to externally output the generated image data.

Next, operation of the image reading apparatus for bound media 1A according to this embodiment will be described. The image reading apparatus for bound media 1A performs the reading operation of both sides of the turned medium 101 while performing the turning operation of the turned medium 101. First, as illustrated in FIG. 1 and FIG. 2, a user places the bound medium 100 on the placement table 2 by inserting the bound portion 102 in the insertion opening 21a. In a standby state of the image reading apparatus for bound media 1A, the first arm 3 is positioned at the first standby position, the second arm 5 at the second standby position, and the lifting unit 7 at the third standby position, respectively.

Subsequently, when the user operates the operating unit to instruct start of operation of the image reading apparatus for bound media 1A, the control unit 91 performs drive control of the third motor 84 of the lifting mechanism 8 to move the lifting unit 7 from the third standby position to the lift start position, downwards (arrow A in FIG. 1) in the vertical direction. Further, along with the movement of the lifting unit 7, the control unit 91 starts supply of negative pressure to the suction portion 72. As illustrated in FIG. 4, when the lifting unit 7 has moved to the lift start position, the lifting unit 7 sucks the turned medium 101, by the distal end portion 72a of the suction portion 72, to which the negative pressure is being supplied, contacting the turned medium 101 before the turning.

Subsequently, the control unit 91 performs drive control of the third motor 84 of the lifting mechanism 8 to move the lifting unit 7 upward (arrow B in FIG. 4) from the lift start position to the third standby position. As illustrated in FIG. 5, the lifting unit 7 separates the turned medium 101 sucked at the lift start position from the bound medium 100 upward, with reference to the bound portion 102. When the turned medium 101 sucked by the lifting unit 7 continues to be lifted upward by the lifting unit 7, the distal end portion 101a of the turned medium 101 as viewed in the depth direction is positioned above an upper end portion of the second arm 5.

Subsequently, the control unit 91 performs drive control of the second motor 64 of the second arm moving mechanism 6 to move the second arm 5 from the second standby position to the turning operation start position, towards the other side (arrow C in FIG. 5) in the opening direction. The control unit 91 moves the second arm 5 after the distal end portion 101a of the turned medium 101 is positioned above the upper end portion of the second arm 5. As illustrated in FIG. 6, the second arm 5 enters between the turned medium 101 and the bound medium 100 at the one side of the bound portion 102 in the opening direction of the bound medium 100, and the turned medium 101 is then positioned between the first arm 3 and the second arm 5. As illustrated in FIG. 7, the turned medium 101 is sandwiched between the first arm 3 and the second arm 5 when the second arm 5 has moved to the turning operation start position. Since the mutually opposite surfaces of the first arm at this first standby position and the second arm 5 at this turning operation start position are sloped to the other side in the opening direction of the bound medium 100 from the vertical direction, the distal end portion 101a of the turned medium 101 sandwiched between the first arm 3 and the second arm 5 is positioned at the other side in the opening direction of the bound portion 102 as viewed in the depth direction. The supply of negative pressure to the suction portion 72 by the control unit 91 may be ended at any time after the second arm 5 has moved until the second arm 5 has got in between the turned medium 101 and the bound medium 100. Further, when the turning operation and reading operation of the bound medium 100 are performed continuously by the image reading apparatus for bound media 1A, the supply of negative pressure to the suction portion 72 by the control unit 91 may be not ended until the continued operation is completed.

Subsequently, the control unit 91 performs drive control of the first motor 44 of the arm moving mechanism 4 to move the first arm 3 from the first standby position to the turning operation completion position and the second arm 5 from the turning operation start position to the turning operation completion position, toward the other side (arrow D in FIG. 7) of the bound portion 102 in the opening direction. Further, along with the movement of the first arm 3 and the second arm 5, the control unit 91 starts control of reading by the first CIS unit 32 and the second CIS unit 52. When the first arm 3 and the second arm 5 move towards the turning operation completion position, positions where the first CIS unit 32 and the second CIS unit 52 oppose each other on both sides of the turned medium 101 change from the bound portion 102 side to the distal end portion 101a. That is, the image reading apparatus for bound media 1A moves the first CIS unit 32 and the second CIS unit 52 in a sub-scanning direction while performing the turning operation of the turned medium 101. Thereby, both sides of the turned medium 101 are respectively imaged by the imaging elements of the first CIS unit 32 and the second CIS unit 52, and image data corresponding to both sides of the turned medium 101 are generated by the image processing unit 92. As illustrated in FIG. 8, the turned medium 101 slips out from between the first arm 3 and the second arm 5 when the first arm 3 and the second arm 5 move to the turning operation completion position. As this happens, since the turned medium 101 is positioned at the other side of the first arm 3 in the opening direction of the bound medium 100, the turning operation has been done. Further, the turned medium 101 that has been turned over is in a state overlapping another medium at the other side in the opening direction of the bound portion 102 on the bound medium 100. The reading control by the control unit 91 with respect to the first CIS unit 32 and the second CIS unit 52 may be ended at any time after the turned medium 101 has slipped out from between the first arm 3 and the second arm 5, for example, when the first arm 3 and the second arm 5 are positioned at the turning operation completion position.

Subsequently, the control unit 91 performs drive control of the first motor 44 of the arm moving mechanism 4 to move the first arm 3 and the second arm 5 from turning operation completion position, respectively to the first standby position and the turning operation start position, toward the bound portion 102 (arrow E in FIG. 8) in the opening direction. When that is done, since the first arm 3 is moved towards the bound portion 102 downward from above the distal end portion 101a of the turned medium 101, even if the turned medium 101 attempts to return to the one side of the bound portion 102, the turned medium 101 is blocked by the first arm 3 and the turned medium 101 is able to be prevented from returning to the one side of the bound portion 102. As illustrated in FIG. 9, the first arm 3 and the second arm 5 return to the first standby position and turning operation start position.

Subsequently, the control unit 91 performs drive control of the second motor 64 of the second arm moving mechanism 6 to move the second arm 5 from the turning operation start position to the second standby position, towards the one side (arrow F in FIG. 9) in the opening direction. As illustrated in FIG. 1, the second arm 5 returns to the second standby position. Thereby, the image reading apparatus for bound media 1A completes the turning operation and reading operation with respect to the one sheet of turned medium 101 and is brought into the original standby state.

As described above, in the image reading apparatus for bound media 1A according to this embodiment, the first standby position of the first arm 3 is the position opposite to the bound portion 102 of the bound medium 100, the position overlapping the bound medium 100 as viewed in the vertical direction. Therefore, since the first arm 3 is not caused to wait at a position not overlapping the bound medium 100 as viewed in the vertical direction for turning over the turned medium 101, the installation space for the image reading apparatus for bound media 1A as viewed in the vertical direction is able to be reduced. Further, the extending direction of the second arm 5 at the second standby position, which is the position not overlapping the bound medium 100 as viewed in the vertical direction, is along the end side at the one side of the turned medium 101 before the turning, and thus the second arm 5 is able to be positioned near the bound medium 100. Therefore, as compared to the case where the extending direction of the second arm 5 is a direction orthogonal the end side at the one side of the turned medium 101; outside the distal end portion 101a, which is the end portion at the one side of the turned medium 101 before the turning, the installation space for the image reading apparatus for bound media 1A as viewed in the vertical direction is able to be reduced.

Further, since the arm moving mechanism 4 according to this embodiment moves the first arm 3 and the second arm 5 along the straight lined track, use of complicated moving mechanisms is able to be avoided, and thus, manufacturing cost of the image reading apparatus for bound media 1A is able to reduced and simple moving mechanisms are able to be adopted, thereby improving the durability.

Second Embodiment

Figure 10:
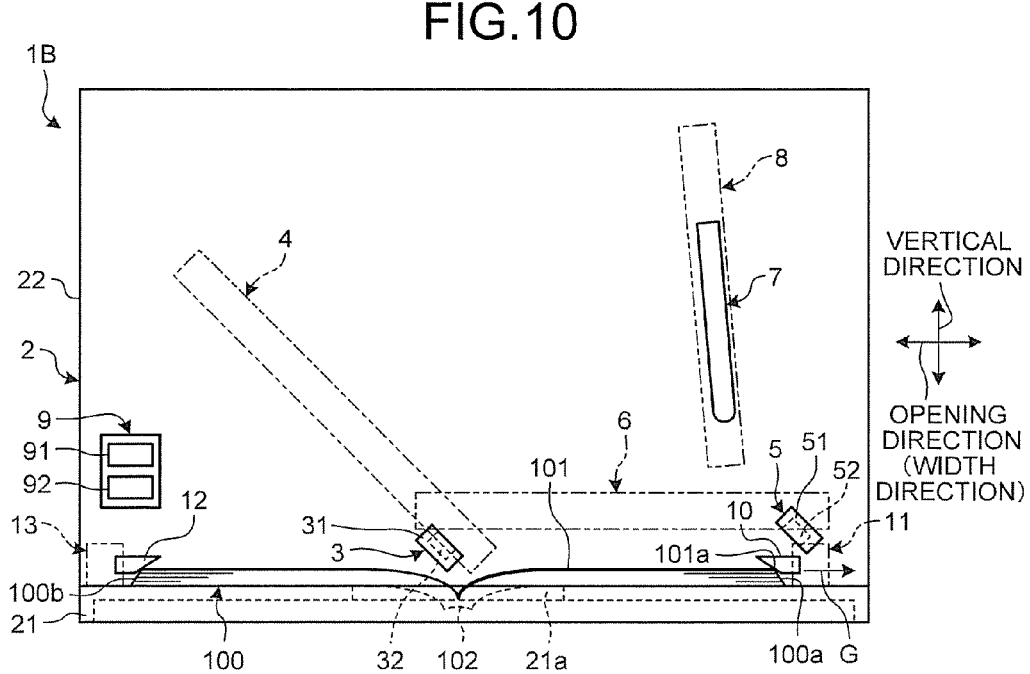
FIG. 10 is a front view of an image reading apparatus for bound media according to a second embodiment.
Figure 11:
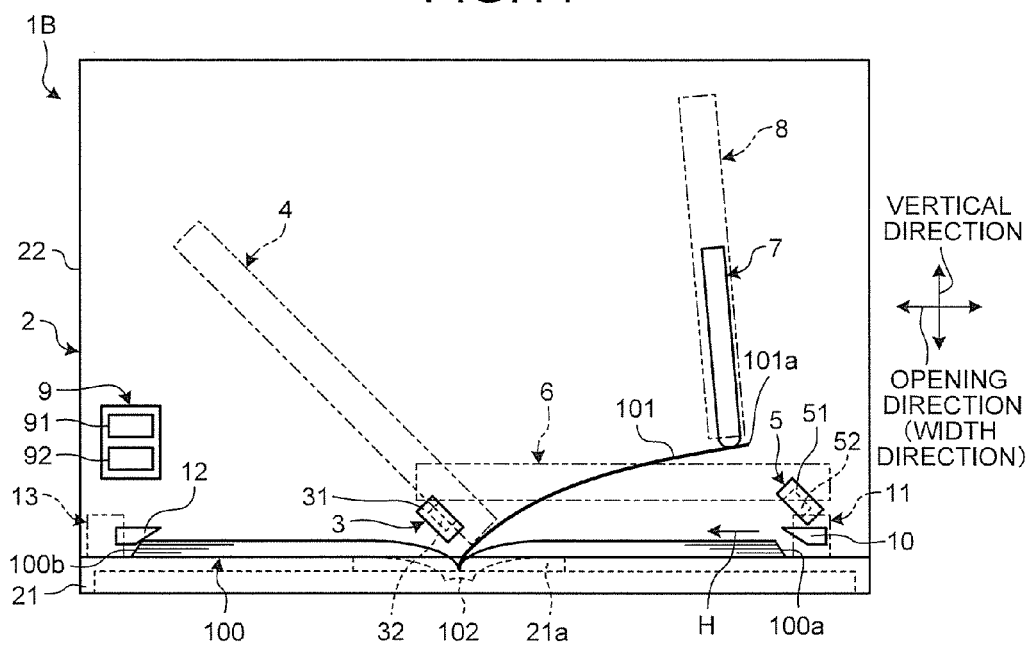
FIG. 11 is an explanatory diagram for operation of the image reading apparatus for bound media according to the second embodiment.
Figure 12:
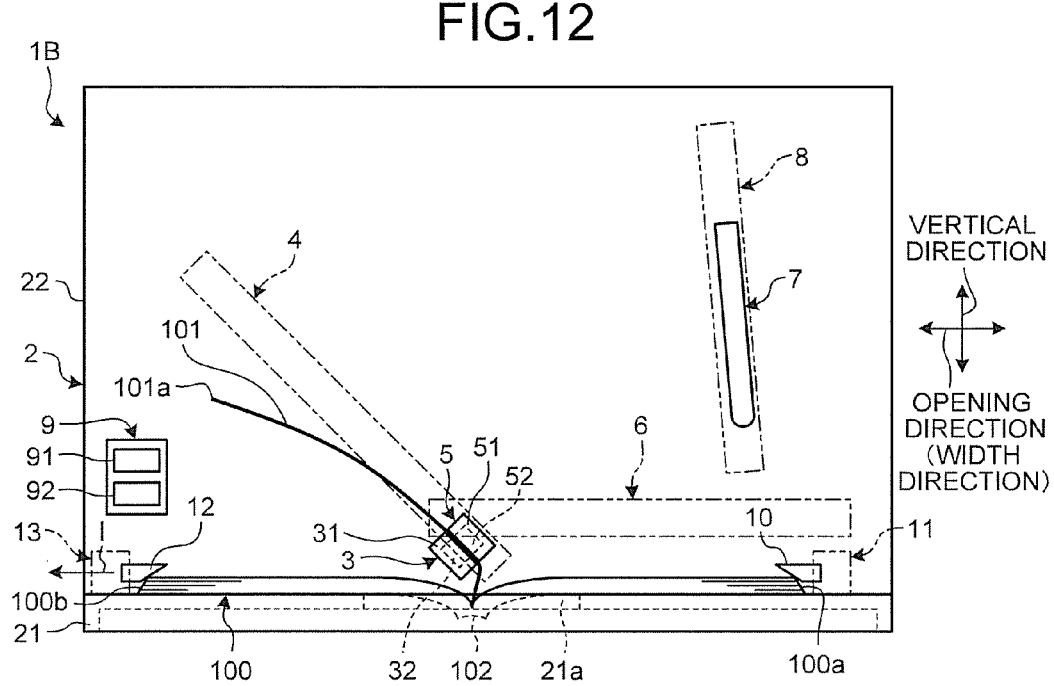
FIG. 12 is an explanatory diagram for the operation of the image reading apparatus for bound media according to the second embodiment.
Figure 13:
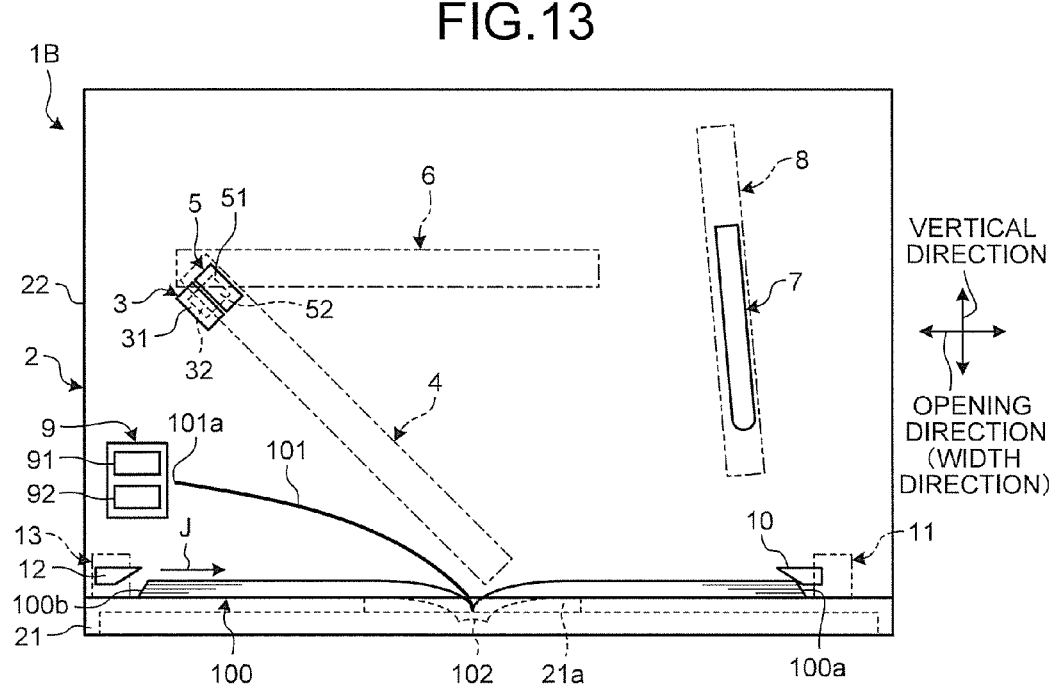
FIG. 13 is an explanatory diagram for the operation of the image reading apparatus for bound media according to the second embodiment.

Next, a second embodiment will be described. FIG. 10 is a front view of an image reading apparatus for bound media according to the second embodiment. FIG. 11 is an explanatory diagram for operation of the image reading apparatus for bound media according to the second embodiment. FIG. 12 is an explanatory diagram for the operation of the image reading apparatus for bound media according to the second embodiment. FIG. 13 is an explanatory diagram for the operation of the image reading apparatus for bound media according to the second embodiment. FIG. 14 is an explanatory diagram for the operation of the image reading apparatus for bound media according to the second embodiment. As illustrated in FIG. 10, an image reading apparatus for bound media 1B according to the second embodiment additionally includes a first holding unit 10 and a second holding unit 12 that hold the bound medium 100 in the opened state. Further, FIG. 10 to FIG. 14 are schematic diagrams, and the respective components therein are illustrated in a partially simplified manner.

The first holding unit 10 holds the end portion 100*a* at the one side in the opening direction of the bound medium 100 in the opened state. The first holding unit 10 is movably supported between a first holding position and a first release position, by a first holding unit moving mechanism 11. The first holding position is a position, where at least a part of the first holding unit 10 overlaps the end portion 100*a* at the one side of the bound medium 100 as viewed in the vertical direction. A surface of the first holding unit 10 at the first holding position, the surface coming into contact with the bound medium 100, is, in consideration of the thickness of the bound medium 100, separated from the placement table main body 21 by a predetermined distance. Further, the first release position is, as illustrated in FIG. 11, a position, where the first holding unit 10 does not overlap, as viewed in the vertical direction, the end portion 100*a* at the one side of the bound medium 100.

The first holding unit moving mechanism 11 releases holding of the end portion 100*a* at the one side by the first holding unit 10, from before the turned medium 101 is lifted up by the lifting unit 7 to the turning operation. The first holding unit moving mechanism 11 is, for example, a linearly moving mechanism, and moves the first holding unit 10, between the first holding position and first release position, along a track, which is parallel to the opening direction of the bound medium 100 and straight lined. Drive control of the first holding unit moving mechanism 11 is performed by the control device 9.

The second holding unit 12 holds the end portion 100*b* at the other side in the opening direction of the bound medium 100 in the opened state. The second holding unit 12 is movably supported between a second holding position and a second release position, by a second holding unit moving mechanism 13. The second holding position is a position, where at least a part of the second holding unit 12 overlaps the end portion 100*b* at the other side of the bound medium 100 as viewed in the vertical direction. A surface of the second holding unit 12 at the second holding position, the surface coming into contact with the bound medium 100, is, in consideration of the thickness of the bound medium 100, separated from the placement table main body 21 by a predetermined distance. Further, the second release position is, as illustrated in FIG. 13, a position, where the second holding unit 12 does not overlap, as viewed in the vertical direction, the end portion 100*b* at the other side of the bound medium 100.

The second holding unit moving mechanism 13 releases holding of the end portion 100*b* at the other side by the second holding unit 12 from after the turning operation until the first arm 3 moves to the first standby position. The second holding unit moving mechanism 13 is, for example, a linearly moving mechanism, and moves the second holding unit 12, between the second holding position and second release position, along a track, which is parallel to the opening direction of the bound medium 100 and straight lined. Drive control of the second holding unit moving mechanism 13 is performed by the control device 9.

Next, operation of the image reading apparatus for bound media 1B according to this embodiment will be described. Basic operation of the image reading apparatus for bound media 1B is similar to that of the image reading apparatus for bound media 1A according to the first embodiment, and thus description thereof will be simplified or omitted. First, as illustrated in FIG. 10, a user places the bound medium 100 on the placement table 2 by inserting the bound portion 102 in the insertion opening 21*a*. In a standby state of the image reading apparatus for bound media 1B, the first arm 3 is positioned at the first standby position, the second arm 5 at the second standby position, the lifting unit 7 at the third standby position, the first holding unit 10 at the first holding position, and the second holding unit 12 at the second holding position, respectively.

Subsequently, when start of operation is instructed with respect to the image reading apparatus for bound media 1B, the control unit 91 performs drive control of the first holding unit moving mechanism 11 to move the first holding unit 10 from the first holding position to the first release position towards the one side in the opening direction (arrow G in FIG. 10). Thereby, the first holding unit 10 no longer overlaps the end portion 100*a* at the one side of the bound medium 100, the holding of the bound medium 100 by the first holding unit 10 is released, and the turned medium 101 is brought into a state of being able to be lifted up by the lifting unit 7.

Subsequently, the control unit 91 performs drive control of the lifting mechanism 8, to cause, as illustrated in FIG. 11, the lifting unit 7 to lift up the turned medium 101.

Subsequently, the control unit 91 performs drive control of the first holding unit moving mechanism 11 to move the first holding unit 10 from the first release position to the first holding position towards the other side (arrow H in FIG. 11) in the opening direction. Thereby, in a state where the turned medium 101 has been lifted up, the bound medium 100 is held by the first holding unit 10 again.

Subsequently, the control unit 91 performs drive control of the second arm moving mechanism 6, to move the second arm 5, as illustrated in FIG. 12, from the second standby position to the turning operation start position and to sandwich the turned medium 101 between the first arm 3 and the second arm 5.

Subsequently, the control unit 91 performs drive control of the second holding unit moving mechanism 13 to move the second holding unit 12 from the second holding position to the second release position towards the other side (arrow I in FIG. 12) in the opening direction. Thereby, the second holding unit 12 no longer overlaps the end portion 100*b* at the other side of the bound medium 100, the holding of the bound medium 100 by the second holding unit 12 is released, and the turned medium 101 that has slipped out from between the first arm 3 and the second arm 5 is brought into a state of being able to overlap another medium at the other side in the opening direction of the bound portion 102 of the bound medium 100.

Subsequently, the control unit 91 performs drive control of the arm moving mechanism 4, to move, as illustrated in FIG. 13, the first arm 3 from the first standby position to the turning operation completion position and the second arm 5 from the turning operation start position to the turning operation completion position, and to cause the first CIS unit 32 and the second CIS unit 52 to perform reading of the turned medium 101. When the first arm 3 and the second arm 5 move to the turning operation completion position, the turned medium 101 slips out from between the first arm 3 and the second arm 5.

Subsequently, the control unit 91 performs drive control of the arm moving mechanism 4 to move the first arm 3 and the second arm 5 from the turning operation completion position, respectively to the first standby position and turning operation start position. Between the slipping out from between the first arm 3 and the second arm 5 and the movement of the first arm 3 to the first standby position, the turned medium 101 overlaps, at the other side of the bound portion 102 in the opening direction of the bound medium 100, with another medium, naturally, or by the first arm 3.

Subsequently, the control unit 91 performs drive control of the second holding unit moving mechanism 13 to move the second holding unit 12 from the second release position to the second holding position towards the one side (arrow J in FIG. 13) in the opening direction. Thereby, in the state where the turned medium 101 overlaps another medium at the other side of the bound medium 100, the end portion 100*b* at the other side of the bound medium 100 is held by the second holding unit 12 again.

Subsequently, the control unit 91 performs drive control of the second arm moving mechanism 6, to move the second arm 5, as illustrated in FIG. 14, from the turning operation start position to the second standby position. Thereby, the image reading apparatus for bound media 1B completes the turning operation and reading operation with respect to the one sheet of turned medium 101 and is brought into the original standby state.

As described above, the image reading apparatus for bound media 1B according to this embodiment has the same effects as the first embodiment, and, since the end portion 100*a* at the one side of the bound medium 100 is held by the first holding unit 10, the one side in the opening direction of the bound medium 100 is able to be prevented from rotating to the other side around the bound portion 102, that is, the bound medium 100 is able to be prevented from closing towards the other side. Further, since the end portion 100*b* at the other side of the bound medium 100 is held by the second holding unit 12, the other side in the opening direction of the bound medium 100 is able to be prevented from rotating to the one side around the bound portion 102, that is, the bound medium 100 is able to be prevented from closing towards the one side. Furthermore, when the first arm 3 is positioned at the first standby position, the first arm 3 is opposite to the bound portion 102, and thus when holding of the bound medium 100 is released by the first holding unit 10 and the second holding unit 12, the bound medium 100 is able to be prevented from closing.

Third Embodiment

Figure 15:
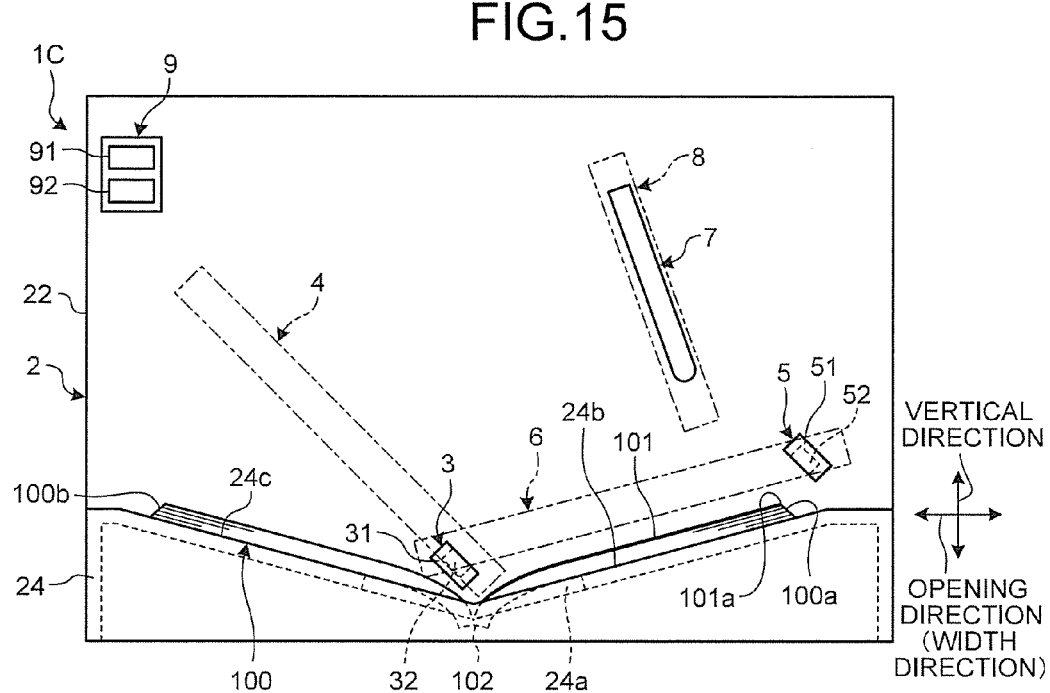
FIG. 15 is a front view of an image reading apparatus for bound media according to a third embodiment.
Figure 16:
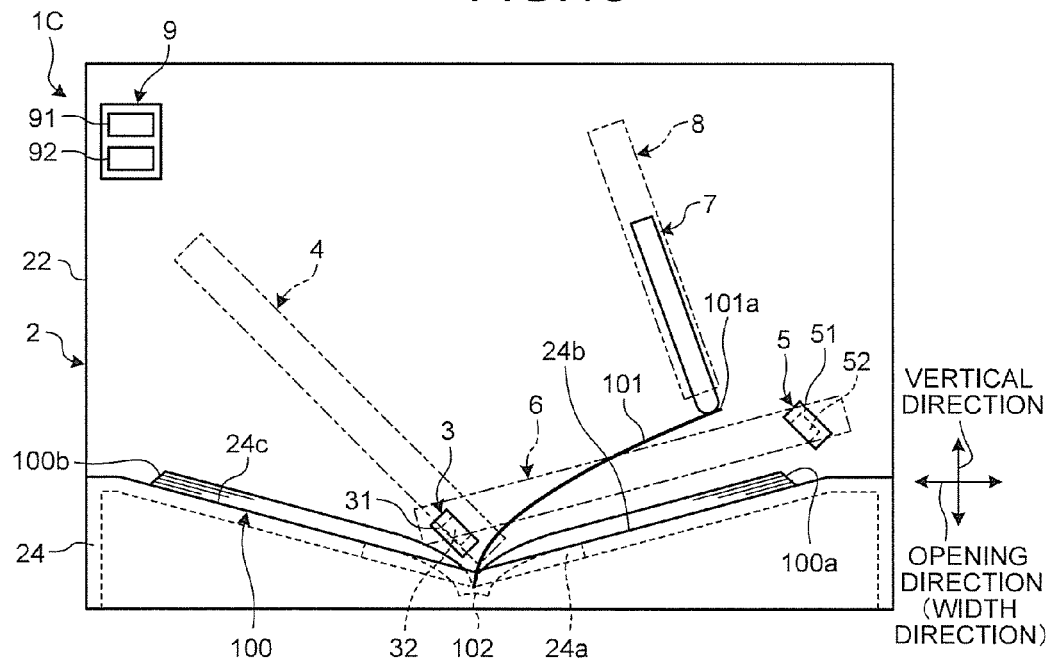
FIG. 16 is an explanatory diagram for operation of the image reading apparatus for bound media according to the third embodiment.
Figure 17:
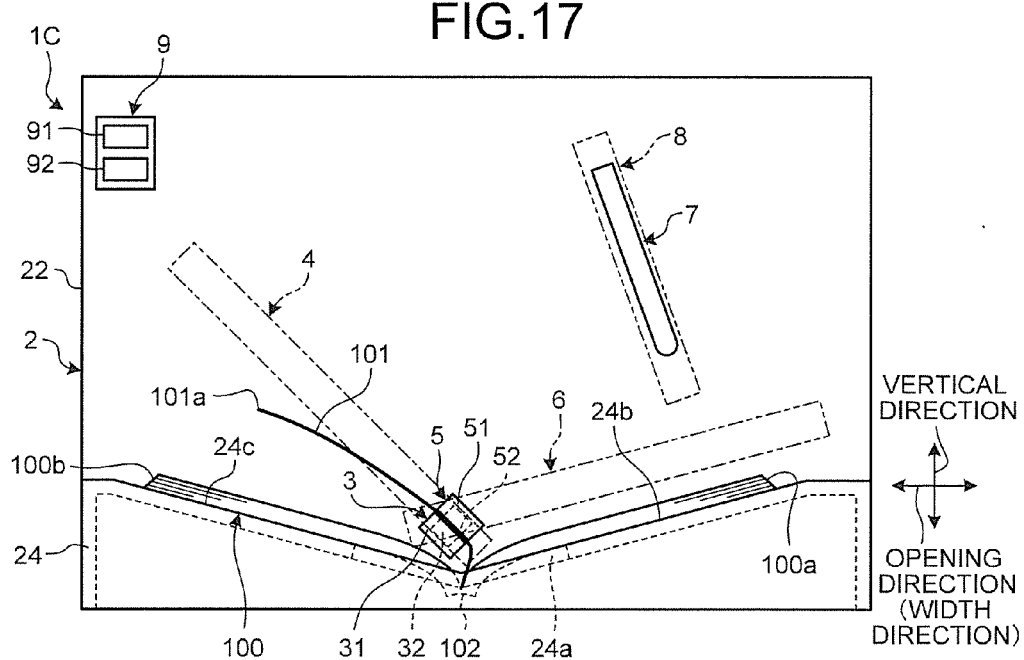
FIG. 17 is an explanatory diagram for the operation of the image reading apparatus for bound media according to the third embodiment.
Figure 18:
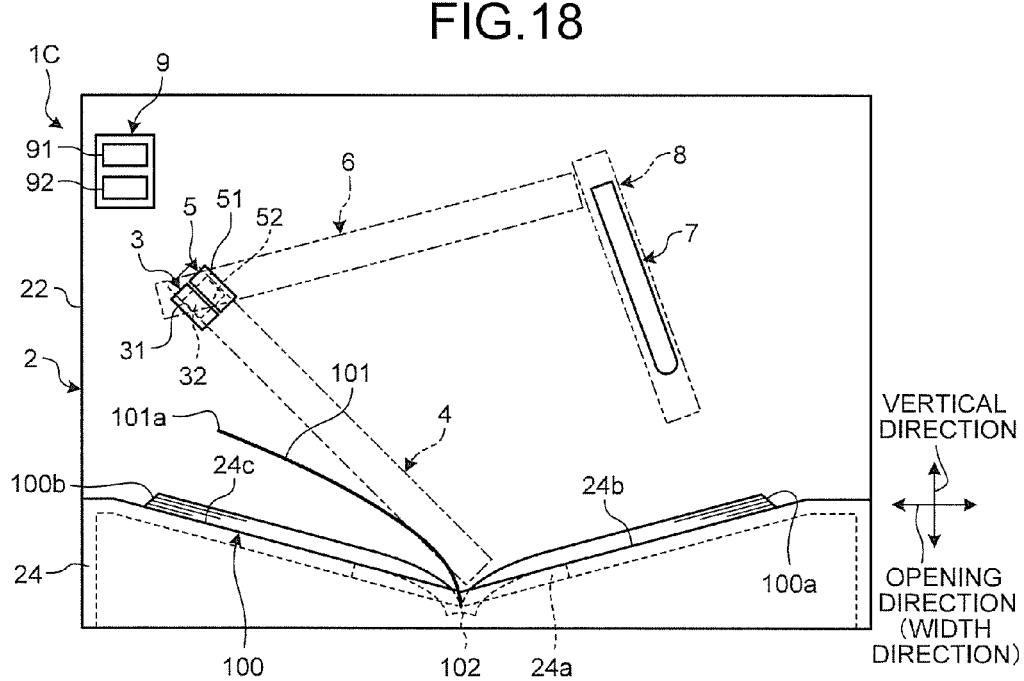
FIG. 18 is an explanatory diagram for the operation of the image reading apparatus for bound media according to the third embodiment.

Next, a third embodiment will be described. FIG. 15 is a front view of an image reading apparatus for bound media according to the third embodiment. FIG. 16 is an explanatory diagram for operation of the image reading apparatus for bound media according to the third embodiment. FIG. 17 is an explanatory diagram for the operation of the image reading apparatus for bound media according to the third embodiment. FIG. 18 is an explanatory diagram for the operation of the image reading apparatus for bound media according to the third embodiment. As illustrated in FIG. 15, in an image reading apparatus for bound media 1C according to the third embodiment, a portion of the placement table 2, on which the bound medium 100 is placed, is V-shaped as viewed in the depth direction. Further, FIG. 15 to FIG. 18 are schematic diagrams, and the respective components therein are illustrated in a partially simplified manner.

A placement table main body 24 of the placement table 2 has, as illustrated in FIG. 15, a surface, on which the bound medium 100 in the opened state is placed, the surface formed in a V-shape as viewed in the depth direction. An insertion opening 24*a* is formed in the placement table main body 24. The insertion opening 24*a* is formed in the center of the V-shape, and in a state where the bound medium 100 has been placed thereon, the bound portion 102 is inserted therein. Therefore, the one side of the bound portion 102 of the bound medium 100 placed on the placement table 2 is placed along a sloped surface 24*b* formed on the one side of the insertion opening 24*a*. On the contrary, the other side of the bound portion 102 of the bound medium 100 is placed along a sloped surface 24*c* formed on the other side of the insertion opening 24*a*.

The second arm moving mechanism 6 according to this embodiment is a linearly moving mechanism, and moves the second arm 5 from the second standby position to the turning operation start position along a track, which is parallel to the sloped surface 24*b* as viewed in the depth direction and is straight lined.

Next, operation of the image reading apparatus for bound media 10 according to this embodiment will be described. Basic operation of the image reading apparatus for bound media 10 is similar to that of the image reading apparatus for bound media 1A according to the first embodiment, and thus description thereof will be simplified or omitted. First, as illustrated in FIG. 15, a user places the bound medium 100 on the placement table 2 by inserting the bound portion 102 in the insertion opening 24*a*. In a standby state of the image reading apparatus for bound media 10, the first arm 3 is positioned at the first standby position, the second arm 5 at the second standby position, and the lifting unit 7 at the third standby position, respectively.

Subsequently, when start of operation is instructed with respect to the image reading apparatus for bound media 10, the control unit 91 performs drive control of the lifting mechanism 8, to cause, as illustrated in FIG. 16, the turned medium 101 to be lifted up by the lifting unit 7.

Subsequently, the control unit 91 performs drive control of the second arm moving mechanism 6, to move the second arm 5, as illustrated in FIG. 17, from the second standby position to the turning operation start position and sandwich the turned medium 101 between the first arm 3 and the second arm 5.

Subsequently, the control unit 91 performs drive control of the arm moving mechanism 4, to move, as illustrated in FIG. 18, the first arm 3 from the first standby position to the turning operation completion position and the second arm 5 from the turning operation start position to the turning operation completion position, and to cause the first CIS unit 32 and the second CIS unit 52 to perform reading of the turned medium 101. When the first arm 3 and the second arm 5 move to the turning operation completion position, the turned medium 101 slips out from between the first arm 3 and the second arm 5.

Subsequently, the control unit 91 performs drive control of the arm moving mechanism 4 to move the first arm 3 and the second arm 5 from the turning operation completion position, respectively to the first standby position and turning operation start position. Subsequently, the control unit 91 performs drive control of the second arm moving mechanism 6, to move the second arm 5 from the turning operation start position to the second standby position. Thereby, the image reading apparatus for bound media 10 completes the turning operation and reading operation with respect to the one sheet of turned medium 101 and is brought into the original standby state (see FIG. 15).

As described above, the image reading apparatus for bound media 10 according to this embodiment has the same effects as the first embodiment, and as compared to the placement table 2 with a flat surface, on which the bound medium 100 is placed, opening angle of the placed bound medium 100 is able to be made smaller as viewed in the vertical direction. Therefore, the bound medium 100 is able to be infallibly placed, in the opened state, on the placement table 2.

Although the arm moving mechanism 4, the second arm moving mechanism 6, and the lifting mechanism 8 are linearly moving mechanisms in the above described first to third embodiments, they are not limited thereto, and may be expansion and contraction mechanisms of air cylinders, hydraulic cylinders, or the like.

Fourth Embodiment

Next, a fourth embodiment will be described. FIG. 19 is a front view of an image reading apparatus for bound media according to the fourth embodiment. FIG. 20 is an explanatory diagram for operation of the image reading apparatus for bound media according to the fourth embodiment. FIG. 21 is an explanatory diagram for the operation of the image reading apparatus for bound media according to the fourth embodiment. FIG. 22 is an explanatory diagram for the operation of the image reading apparatus for bound media according to the fourth embodiment. As illustrated in FIG. 19, in an image reading apparatus for bound media 1D according to the fourth embodiment, the second arm 5 is rotationally moved from the second standby position to the turning operation start position. Further, a track of the first arm 3 from the first standby position to the turning operation completion position and of the second arm 5 from the turning operation start position to the turning operation completion position is a curve. Further, FIG. 19 to FIG. 22 are schematic diagrams, and the respective components therein are illustrated in a partially simplified manner.

An arm moving mechanism 14 turns the turned medium 101, as illustrated in FIG. 21, by relatively moving, with respect to the turned medium 101, the first arm 3 and the second arm 5 sandwiching the turned medium 101 and opposite to each other. The arm moving mechanism 14 moves the first arm 3 from the first standby position to the turning operation completion position. Further, the arm moving mechanism 14 moves the second arm 5 positioned at the turning operation start position to the turning operation completion position. The turning operation completion position is a position, at which the distal end portion 101a of the turned medium 101 sandwiched between the first arm 3 and the second arm 5 slips out from the first arm 3 and the second arm 5, and is the position at the other side of the bound portion 102 of the turned medium 101 of the bound medium 100 as viewed in the vertical direction. A distance of the turning operation completion position in this embodiment from the first standby position is a distance where the distal end portion 101a of the turned medium 101 is able to be slipped out from the first arm 3 and the second arm 5.

The arm moving mechanism 14 according to this embodiment moves the first arm 3 and the second arm 5 sandwiching the turned medium 101 and opposite to each other, from the first standby position and turning operation start position to the turning operation completion position along a track, which is a curve, as viewed in the depth direction. The curve is a curve, which is projected upward in the vertical direction of the bound medium 100. A portion near the bound portion 102 of the bound medium 100, such as a book, in particular, is projected upward than both of the end portions 100a and 100b in the opening direction. Therefore, when the track is a straight line, in order to avoid interference with this projected portion, the position at the turning operation completion position is difficult to be made close to the placement table main body 21, and thus the interval between the distal end portion 101a of the turned medium 101 and the end portion 100b at the other side becomes large. Since after the turning operation completion position, the first arm 3 and the second arm 5 do not actively interfere with the turned medium 101 so that the turned medium 101 overlaps another medium at the other side of the bound medium 100, the smaller the interval is, the more stably the turned medium 101 is able to overlap another medium at the other side of the bound medium 100, that is, the more stably the page is able to be turned over. Therefore, when the track is a curve that is projected upward in the vertical direction of the bound medium 100, while interference with the projected portion is able to be prevented, the interval between the distal end portion 101a of the turned medium 101 and the end portion 100b at the other side at the turning operation completion position is able to be made smaller, and thus stable page turning is able to be realized. The arm moving mechanism 14 is not particularly limited, as long as the arm moving mechanism 14 is a mechanism that is able to move the first arm 3 and the second arm 5 along a curved track.

The second standby position of the second arm 5 in this embodiment is outside an end portion at the far side, of both end portions of the turned medium 101 before the lifting thereof, the both end portions in the extending direction of the bound portion 102, and the extending direction of the second arm 5 is along the end side of the turned medium 101, the end side parallel to the opening direction of the bound medium 100.

A second arm moving mechanism 15 moves the second arm 5, as illustrated in FIG. 19, from the second standby position to the turning operation start position in the state where the turned medium 101 has been lifted up from the bound medium 100. The second arm moving mechanism 15 according to this embodiment is a rotational mechanism, and rotates the second arm 5 with the vertical direction being the axis of rotation by supporting an end portion at one side of the second arm 5 (end portion at the far side in the extending direction when the second arm 5 is positioned at the turning operation start position). That is, the second arm moving mechanism 15 is parallel to the opening direction of the bound medium 100, and performs the rotational movement from the second standby position to the turning operation start position along the rotational track with the vertical direction being the axis of rotation. In order to rotate the second arm 5, the second arm moving mechanism 15 has a second motor not illustrated, and is connected to the control device 9.

Next, the operation of the image reading apparatus for bound media 1D according to this embodiment will be described. Basic operation of the image reading apparatus for bound media 1D is similar to that of the image reading apparatus for bound media 1A according to the first embodiment, and thus description thereof will be simplified or omitted. First, as illustrated in FIG. 19, a user places the bound medium 100 on the placement table 2 by inserting the bound portion 102 in the insertion opening 21a. In a standby state of the image reading apparatus for bound media 1D, the first arm 3 is positioned at the first standby position, the second arm 5 at the second standby position, and the lifting unit 7 at the third standby position, respectively.

Subsequently, when start of operation is instructed with respect to the image reading apparatus for bound media 1D, the control unit 91 performs drive control of the lifting mechanism 8, to cause, as illustrated in FIG. 20, the turned medium 101 to be lifted up by the lifting unit 7.

Subsequently, the control unit 91 performs drive control of the second arm moving mechanism 15 to rotationally move the second arm 5 from the second standby y position to the turning operation start position (arrow K in FIG. 20) and to move the second arm 5 to the turning operation start position, to thereby sandwich the turned medium 101 between the first arm 3 and the second arm 5 as illustrated in FIG. 21.

Subsequently, the control unit 91 performs drive control of the arm moving mechanism 14 to move the first arm 3 from the first standby position to the turning operation completion position and the second arm 5 from the turning operation start position to the turning operation completion position along the curved track (arrow L in FIG. 21) and to cause the first CIS unit 32 and the second CIS unit 52 to perform reading of the turned medium 101. When the first arm 3 and the second arm 5 move to the turning operation completion position, as illustrated in FIG. 22, the turned medium 101 slips out from between the first arm 3 and the second arm 5.

Subsequently, the control unit 91 performs drive control of the arm moving mechanism 4 to move the first arm 3 and the second arm 5 from the turning operation completion position, respectively to the first standby position and turning operation start position. Subsequently, the control unit 91 performs drive control of the second arm moving mechanism 15, to rotationally move the second arm 5 from the turning operation start position to the second standby position. Thereby, the image reading apparatus for bound media 1D completes the turning operation and reading operation with respect to the one sheet of turned medium 101 and is brought into the original standby state.

As described above, in the image reading apparatus for bound media 1D according to this embodiment, the first standby position of the first arm 3 is the position opposite to the bound portion 102 of the bound medium 100, and overlaps the bound medium 100 as viewed in the vertical direction. Therefore, since the first arm 3 is not caused to wait at a position not overlapping the bound medium 100 as viewed in the vertical direction for turning over the turned medium 101, the installation space for the image reading apparatus for bound media 1D as viewed in the vertical direction is able to be made smaller. Further, since the extending direction of the second arm 5 at the second standby position, which is the position not overlapping the bound medium 100 as viewed in the vertical direction, is along the end side in the extending direction of the bound portion 102 of the turned medium 101 before the turning, the second arm 5 at the second standby position is able to be positioned near the bound medium 100. Therefore, as compared to a case where the extending direction of the bound portion 102 is the extending direction of the second arm 5; outside the end portion (end portion at the far side) in the extending direction of the bound portion 102 of the turned medium 101 before the turning, the installation space for the image reading apparatus for bound media 1D as viewed in the vertical direction is able to be made smaller.

In the above described first to fourth embodiments, the predetermined bound medium 100 is read, but a bound medium 100, which is smaller than the predetermined bound medium 100, may be read. In this case, by causing the lifting mechanism 8 to move the lifting unit 7 in the opening direction of the bound medium 100, and causing the lifting unit 7 at the lift start position to be opposite to the one side of the bound portion 102, the one side of the turned medium 101 as viewed in the vertical direction, a bound medium 100 smaller than the predetermined bound medium 100 is able to be lifted up by the lifting unit 7. Thereby, even for a bound medium 100 smaller than the predetermined bound medium 100, the turned medium 101 is able to be sandwiched between the first arm 3 and the second arm 5.

Further, in the above described first to fourth embodiments, the lifting unit 7 lifts up the turned medium 101 by suction, but not being limited thereto, for example, a portion of the lifting unit 7, the portion with which the turned medium 101 comes into contact, may be a member that generates adhesive force and the turned medium 101 may be lifted up from the bound medium 100 by the adhesive force.

The components in the above described first to fourth embodiments are applicable to any of the other embodiments. For example, the arm moving mechanism 4 and the second arm moving mechanism 6 of the first to third embodiments may be respectively replaced with the arm moving mechanism 14 and the second arm moving mechanism 15 of the fourth embodiment. Further, the placement table main body 21 of the first, second, or fourth embodiment may be replaced with the placement table main body 24 of the third embodiment. Furthermore, the first holding unit 10 and the second holding unit 12 of the second embodiment may be added to the first, third, and fourth embodiments.

In an image reading apparatus for bound media according to the present disclosure, a first standby position of a first arm is a position opposite to a bound portion of a bound medium and overlaps the bound medium as viewed in a vertical direction. Therefore, since a first arm is not caused to wait at a position not overlapping the bound medium as viewed in the vertical direction for turning over a turned media, an effect of being able to reduce the installation space is achieved.

All examples and conditional language recited herein are intended for pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although the embodiments of the present disclosure have been described in detail, it should be understood that the various changes, substitutions, and alterations could be made hereto without departing from the spirit and scope of the disclosure.

What is claimed is:

1. An image reading apparatus for bound media, comprising:
    a placement table, on which a bound medium is placed;
    a first arm that is, at a first standby position, opposite to a bound portion of the bound medium, and is, in turning operation in which a turned medium of the bound medium turns over from one side to the other side in an opening direction of the bound medium, opposite to the other side of the turned medium;
    a second arm that does not overlap, at a second standby position, the bound medium as viewed in a vertical direction, and that is, in the turning operation, opposite to the one side of the turned medium;
    a lifting unit that lifts up, from the bound medium, an end portion of the turned medium before the turning, the end portion at the one side in the opening direction;
    a second arm moving mechanism that moves the second arm from the second standby position to a turning operation start position where the second arm is opposite to the first arm at the first standby position with the turned medium sandwiched between the first arm and the second arm, in a state where the turned medium has been lifted up from the bound medium;
    an arm moving mechanism that relatively moves, with respect to the turned medium, the first arm and the second arm sandwiching the turned medium and opposite to each other from the bound portion side of the turned medium until a distal end portion of the turned medium slips out therefrom, and that moves the turned medium to the other side of the bound portion as viewed in the vertical direction of the bound medium;

a first imaging unit that is provided, in the first arm, oppositely to the turned medium in the turning operation, and that performs imaging of the other side of the turned medium; and a second imaging unit that is provided, in the second arm, oppositely to the turned medium in the turning operation, and that performs imaging of the one side of the turned medium.

2. The image reading apparatus for bound media according to claim 1, wherein the second arm is, at the second standby position, along an end side of the turned medium before the lifting.

3. The image reading apparatus for bound media according to claim 1, wherein the second standby position is outside the end portion at the one side of the turned medium before the lifting in the opening direction of the bound medium, and the second arm moving mechanism moves the second arm from the second standby position to the turning operation start position.

4. The image reading apparatus for bound media according to claim 1, wherein the second standby position is outside an end portion of the turned medium in an extending direction of the bound portion, and the second arm moving mechanism rotationally moves the second arm from the second standby position to the turning operation start position.

5. The image reading apparatus for bound media according to claim 1, wherein the arm moving mechanism moves the first arm and the second arm sandwiching the turned medium and opposite to each other along any of, as viewed in the extending direction: a track that is straight lined; and a track that is curved to be projected upward in the vertical direction of the bound medium.

6. The image reading apparatus for bound media according to claim 1, further comprising:

a first holding unit that holds an end portion at the one side in the opening direction of the bound medium; and a second holding unit that holds an end portion at the other side in the opening direction of the bound medium, wherein the first holding unit releases the holding of the end portion at the one side when the turned medium is lifted up by the lifting unit, and the second holding unit releases the holding of the end portion at the other side from after the turning operation to movement of the first arm to the first standby position.

7. The image reading apparatus for bound media according to claim 1, wherein the placement table has an insertion opening formed therein, into which the bound portion of the bound medium is inserted.

* * * * *